US012561863B2

(12) United States Patent
Baranovskiy

(10) Patent No.: US 12,561,863 B2
(45) Date of Patent: Feb. 24, 2026

(54) CREATING AND MODIFYING CIRCULAR ARCS WHILE MAINTAINING ARC QUALITIES WITHIN A DIGITAL DESIGN DOCUMENT

(71) Applicant: Adobe Inc., San Jose, CA (US)

(72) Inventor: Dmytro Baranovskiy, Sydney (AU)

(73) Assignee: Adobe Inc., San Jose, CA (US)

( * ) Notice: Subject to any disclaimer, the term of this patent is extended or adjusted under 35 U.S.C. 154(b) by 109 days.

(21) Appl. No.: 18/332,516

(22) Filed: Jun. 9, 2023

(65) Prior Publication Data

US 2024/0412431 A1     Dec. 12, 2024

(51) Int. Cl.
*G06T 11/60* (2006.01)
*G06F 3/04845* (2022.01)
*G06T 11/20* (2006.01)

(52) U.S. Cl.
CPC .......... *G06T 11/60* (2013.01); *G06F 3/04845* (2013.01); *G06T 11/203* (2013.01); *G06T 2200/24* (2013.01)

(58) Field of Classification Search
CPC ... G06T 11/60; G06T 11/203; G06T 2200/24; G06F 3/04845
USPC ........................................................ 715/211
See application file for complete search history.

(56) References Cited

U.S. PATENT DOCUMENTS

| | | | | |
|---|---|---|---|---|
| 5,123,087 | A * | 6/1992 | Newell | ............... G06F 3/04812 |
| | | | | 706/919 |
| 6,441,822 | B1 * | 8/2002 | Johnson | ................ G06T 11/203 |
| | | | | 345/15 |
| 2013/0321428 | A1 * | 12/2013 | Levien | .................. G06T 11/203 |
| | | | | 345/442 |

OTHER PUBLICATIONS

Screen capture from YouTube video clip entitled "H19 Nodes 04 | Curve," 1 page, uploaded on Nov. 25, 2021 by user "Houdini". Retrieved from Internet: <https://www.youtube.com/watch?v=ZEu5NQahvTw&t=54s>.
"AutoCAD. Anywhere." webpage <https://web.autocad.com/login>, 1 page, 2023, retrieved on Aug. 1, 2023.

* cited by examiner

*Primary Examiner* — Stephen S Hong
*Assistant Examiner* — Broderick C Anderson
(74) *Attorney, Agent, or Firm* — Keller Preece PLLC

(57) ABSTRACT

The disclosed systems, methods, and non-transitory computer readable media provide a digital design interface for creating and modifying circular arc segments as drawing elements within an arc path segment in a cohesive and visually consistent manner. In particular, the disclosed systems generate a circular arc segment comprising a first endnode and a second endnode, wherein the second endnode of the circular arc segment is connected to a design segment comprising the second endnode and a third endnode. In addition, the disclosed systems determine a first continuity setting for the first endnode, a second continuity setting for the second endnode, and a third continuity setting for the third endnode. Moreover, in response to a user interaction, the disclosed systems generate a modified circular arc segment and a modified design segment according to the first continuity setting, the second continuity setting, and the third continuity setting.

20 Claims, 24 Drawing Sheets

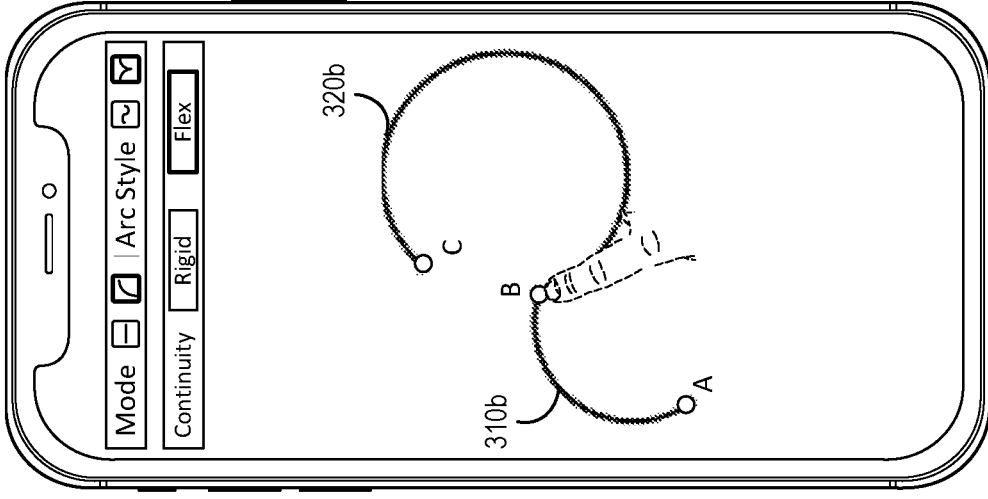
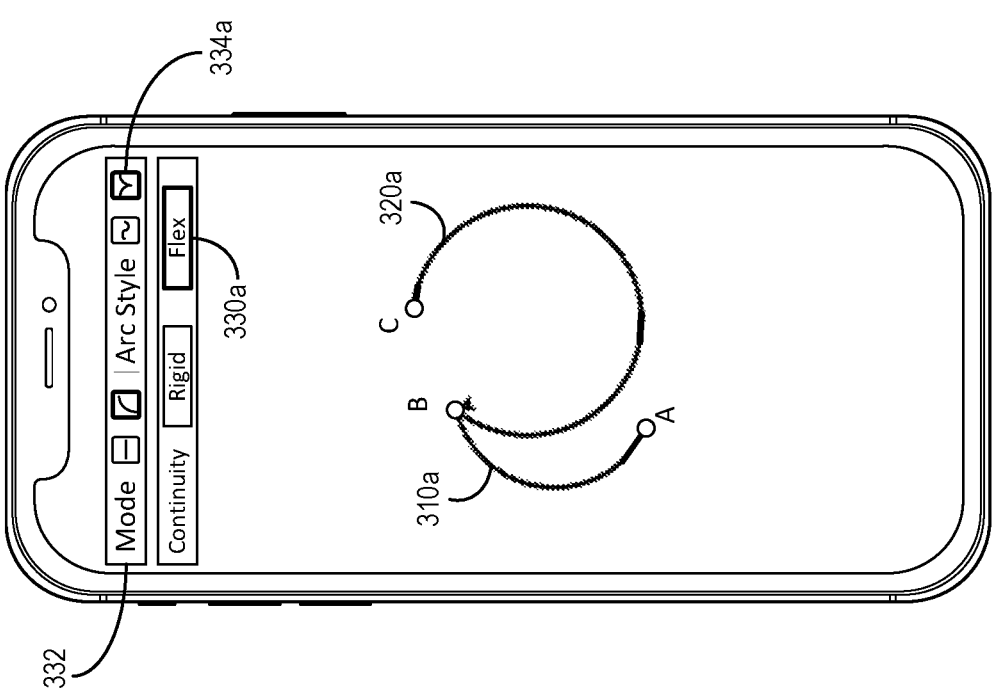
*Fig. 3A*

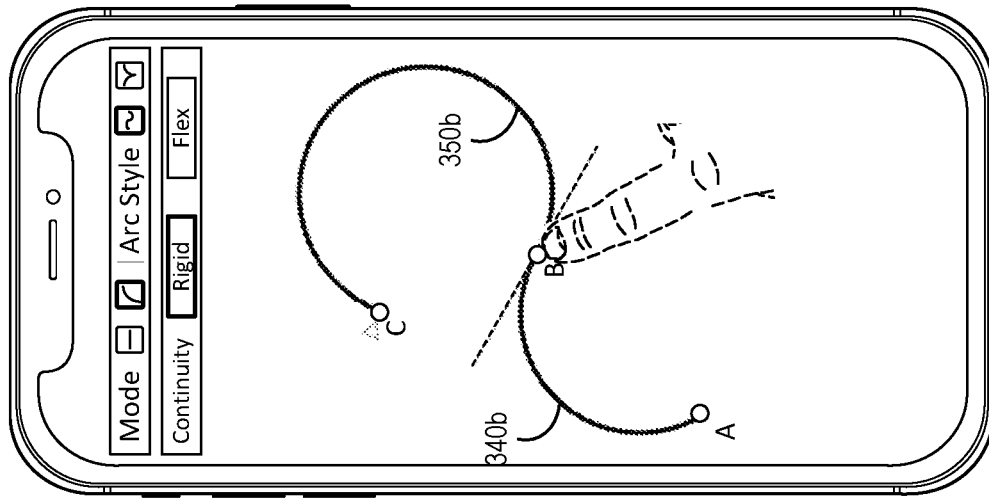
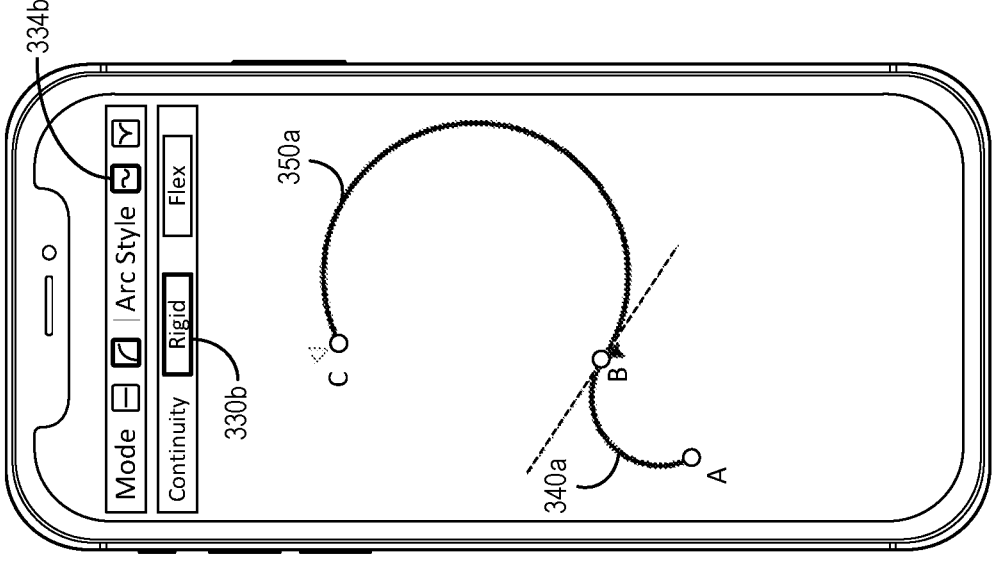
*Fig. 3B*

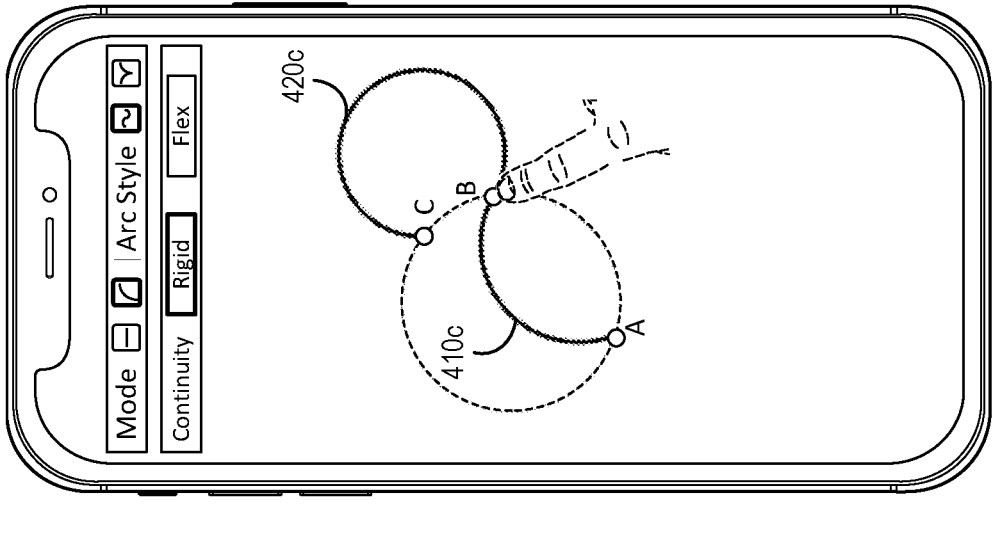
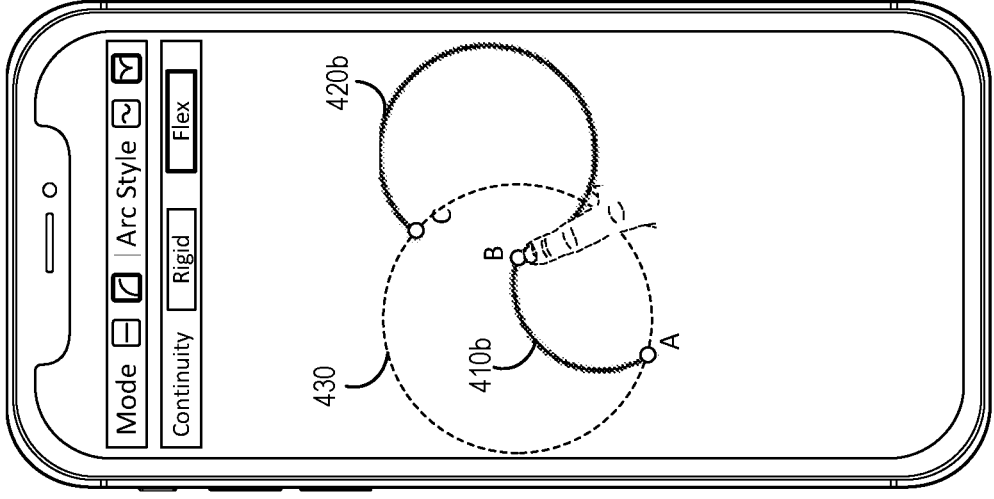
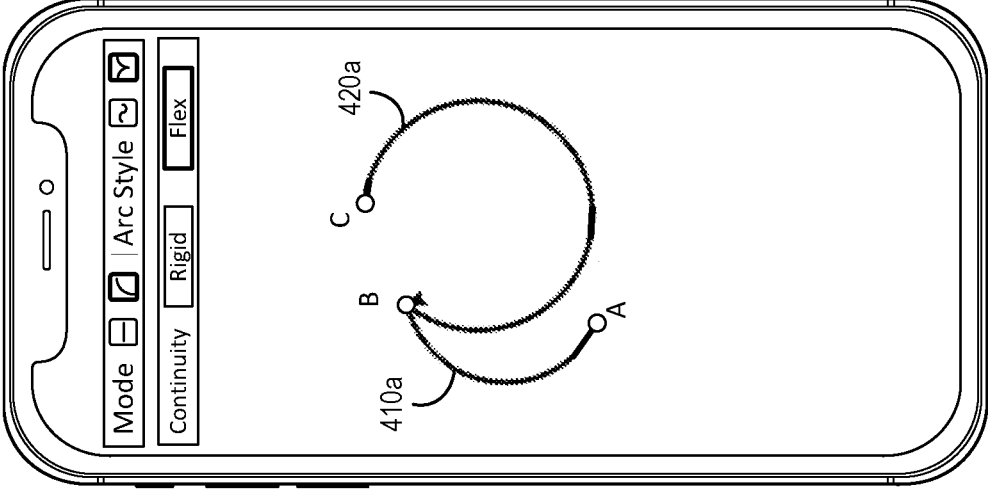
*Fig. 4A*

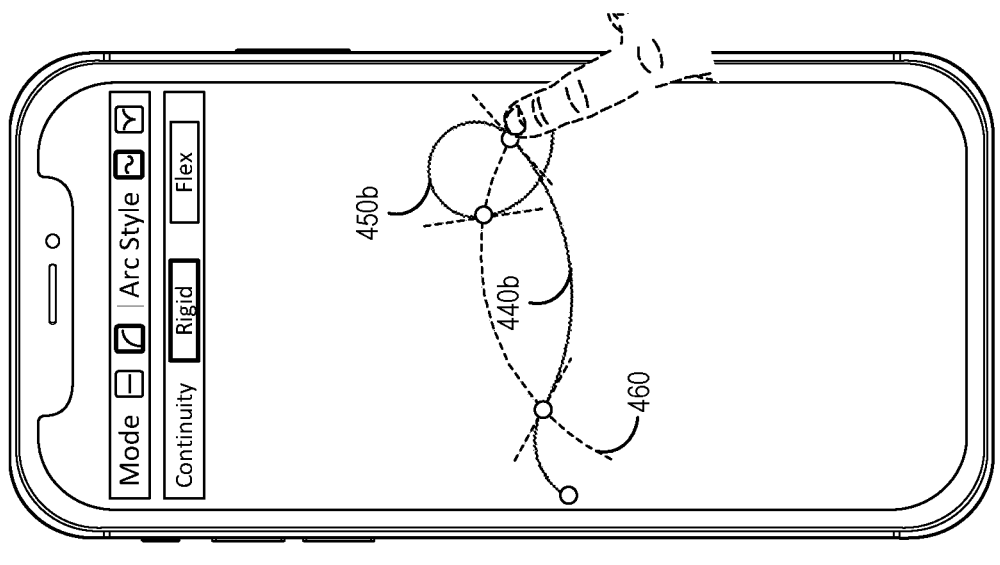
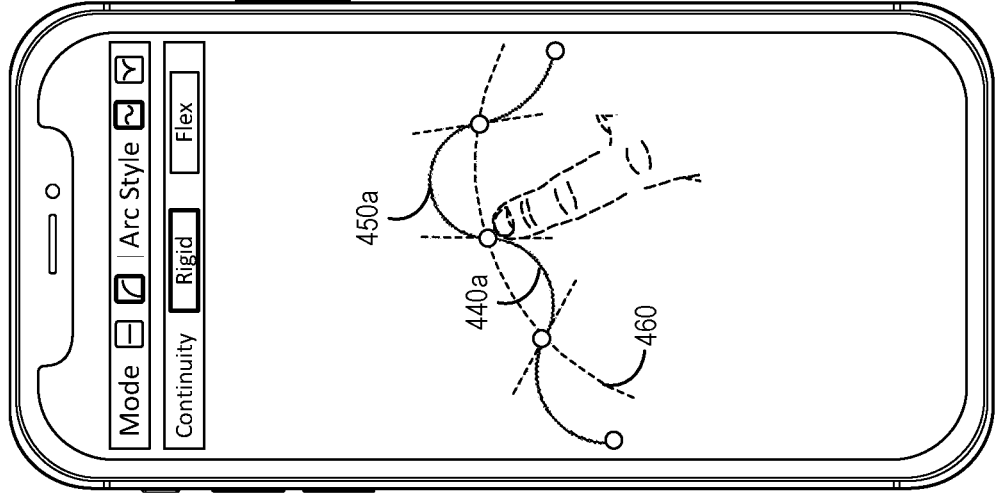
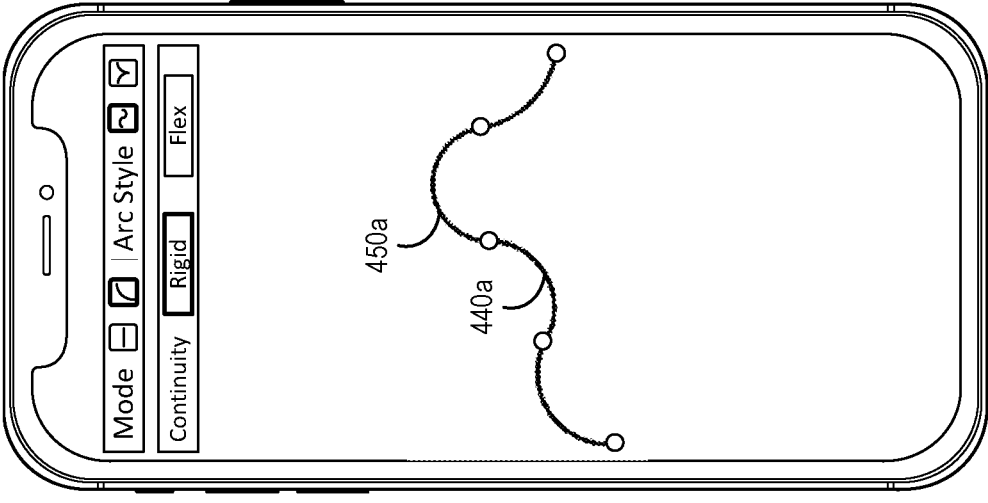
*Fig. 4B*

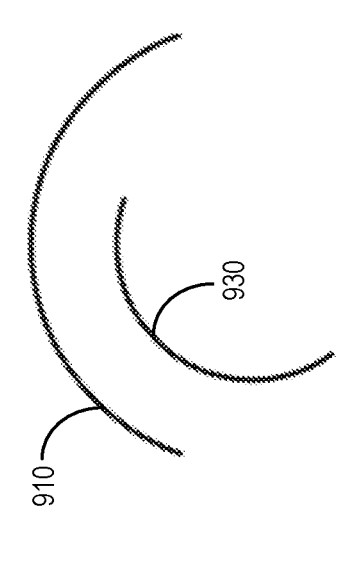
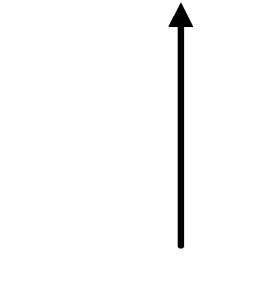
Fig. 9A
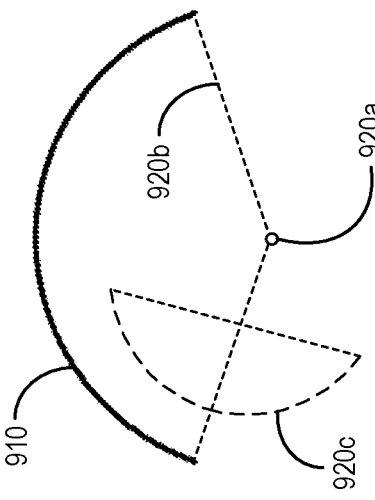
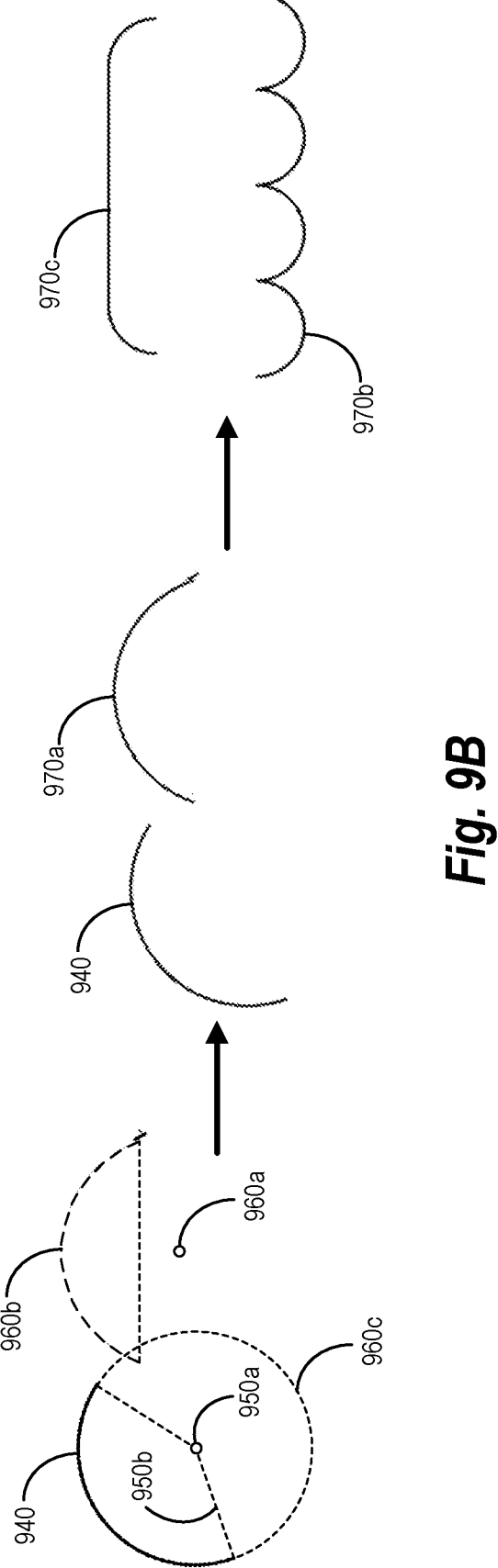
Fig. 9B

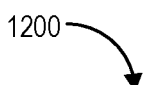

1200

Generating A Circular Arc Segment Comprising A First Endnode And A Second Endnode, Wherein The Second Endnode Is Connected To A Design Segment Comprising A Third Endnode *1202*

Determining A First Continuity Setting For The First Endnode, A Second Continuity Setting For The Second Endnode, And A Third Continuity Setting For The Third Endnode *1204*

In Response To A User Interaction, Moving The Second Endnode To A New Position And Generating A Modified Design Segment According To The First Continuity Setting, The Second Continuity Setting, And The Third Continuity Setting *1206*

*Fig. 12*

CREATING AND MODIFYING CIRCULAR ARCS WHILE MAINTAINING ARC QUALITIES WITHIN A DIGITAL DESIGN DOCUMENT

BACKGROUND

Advancements in computing devices and computer design applications have given rise to a variety of innovations in computer image design and editing software. For example, some computer design applications can edit and manipulate complicated digital images that include vector curves, such as Bezier curves. Unfortunately, partially due to the complexity inherent in such vector curves, it can be difficult for client devices to manipulate individual shapes accurately within an image in a cohesive and visually consistent manner. Additionally, computer design applications provide complex graphical interfaces for working with Bezier curves and other vector curve elements, which undermines efficiency Accordingly, the state of the art has a number of shortcomings with regard to flexibility, accuracy, and efficiency when creating, editing, and manipulating design elements within digital images.

SUMMARY

One or more embodiments provide benefits and/or solve one or more of the foregoing or other problems in the art with systems, methods, and non-transitory computer readable storage media that provide a design interface for creating and modifying circular arcs segments within a sequential path in a cohesive and consistent manner. In particular, in one or more implementations, the disclosed systems create and manipulate circular arc elements within digital design documents while maintaining the fidelity of, and the constraints inherent in, the native circular arc elements. The disclosed systems provide a user interface to modify a circular arc segment connected to other circular arc segments (or other design elements) within a digital design document by moving endnodes according to dynamic continuity settings at the endnodes. Unlike existing systems that utilize Bezier curves or other vector curve elements to approximate arc segments, the disclosed systems can generate and modify circular arc segments while maintaining precise and accurate arc qualities. Moreover, the system utilizes a variety of different approaches depending on the continuity settings for different endnodes of a circular arc segment. For example, in one or more embodiments, the disclosed systems provide an interface to modify a circular arc segment within a digital design document by moving an endnode of a circular arc segment while constraining the endnode tangent angles and maintaining the mathematical fidelity of the connected circular arc segment. Furthermore, the disclosed systems provide an interface to design using circular arc segments by snapping circular arc segments into position based on an arc tangent, radius, and/or center point.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIGS. 3A-3B illustrate an example overview of using a graphical user interface to generate and modify a circular arc segment utilizing a flexible continuity setting and a rigid continuity setting in accordance with one or more embodiments;

FIGS. 4A-4B illustrate an example overview of modifying a circular arc segment with a flexible endnode and a rigid endnode utilizing a rigid continuity conversion shape in accordance with one or more embodiments;

FIGS. 9A-9C illustrate an example of generating and snapping a new circular arc segment to a radius, a center, or a tangent of a circular arc segment in accordance with one or more embodiments;

FIG. 12 illustrates a flowchart of a series of acts for generating and modifying a digital circular arc segment in accordance with one or more embodiments.

DETAILED DESCRIPTION

Figure 1:
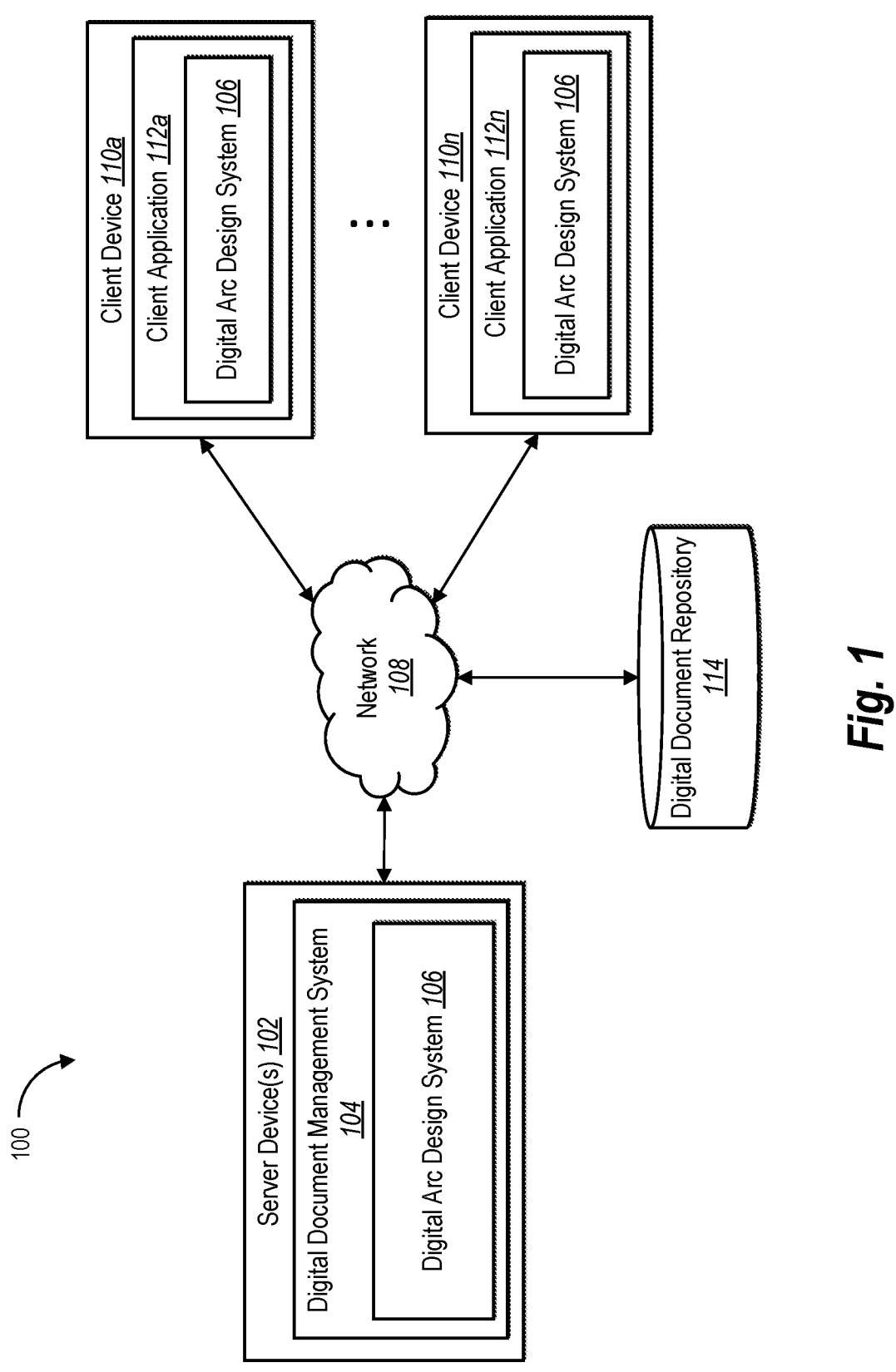
FIG. 1 illustrates a schematic diagram of an example environment of a digital arc design system in accordance with one or more embodiments.

This disclosure describes one or more embodiments of a digital arc design system that provides a digital design interface for creating and modifying circular arc segments as drawing elements within a sequential path in a cohesive and visually consistent manner. In particular, in one or more implementations, the digital arc design system creates and manipulates circular arc elements within digital design documents while maintaining the fidelity of. and the constraints inherent in, the arc elements. For example, in one or more embodiments, the digital arc design system provides an interface to modify a circular arc segment within a digital design document by moving an interconnected arc endnode while the constraining the endnode tangents and maintaining the mathematical fidelity of the circular arc segment.

As discussed above, conventional systems have a number of technical shortcomings with regard to ease of use and computational efficiency when creating and manipulating arc path segments. In particular, conventional design systems lack the flexibility of creating and manipulating circular arcs while maintaining the inherent qualities of an arc. For example, existing conventional systems render and manipulate circular arc segments as Bézier curves or other curve approximations rather than maintaining the qualities of a circular arc segment when editing or modifying the circular arc segments. Bezier curves are often easier to manipulate but fail to maintain the qualities of a circular arc, and are thus, less precise and accurate.

Relatedly, conventional systems that manipulate vector curves are often inefficient. For example, conventional systems require significant user interactions to modify Bezier curves in a manner that approximates an arc. To illustrate, conventional systems provide a variety of user interface elements for modifying curvature or location of Bezier curves, where each modification also modifies characteristics or features of other segments of the Bezier curves. Thus, conventional systems often require significant time and user interactions in sequentially and iteratively modifying Bezier curve control points to (inaccurately) approximate circular arc segments.

As suggested above, embodiments of the digital arc design system can provide a variety of advantages over conventional design systems. For instance, the digital arc design system can improve operational flexibility. For example, the digital arc design system provides a user interface for manipulation of circular arc segments (e.g., utilizing a mouse, touch screen, or other input element) as circular arc segments (i.e., while maintaining precise arc qualities and features). Indeed, unlike conventional systems that utilize Bézier curves as design elements, the digital arc design system does not require the use of excessive control points and handles to approximate a circular arc segment. Accordingly, the digital arc design system allows for precise and accurate manipulation of circular arc segments within a path or sequence of digital design elements through an efficient user interface.

The digital arc design system can provide improved accuracy, precision, and functionality by maintaining arc segments while also providing for dynamic selection of different continuity constraints. Indeed, the digital arc design system can generate and modify digital arcs as part of a path or sequence of design segments, where each design segment is connected to an adjacent design segment with an endnode and corresponding continuity constraint (e.g., rigid requiring tangent continuity or flexible requiring geometric continuity). The digital arc design system can modify circular arc segments while maintaining the continuity constraints at various endnodes.

Additionally, the digital arc design system also improves efficiency and flexibility by providing clear anchoring guidelines for transitioning between endnode continuity constraints when manipulating an arc path segment. Thus, for example, the digital arc design system can provide a circular shape defining points consistent with tangent continuity between two circular arcs that allow for transitioning from a flexible endnode to a rigid endnode. This allows for a significant improvement over conventional systems that utilize a plurality of Bezier curves and manipulation of handles across different control points to approximate such transformations.

Indeed, the digital arc design system can provide significant improvements in is operational efficiency relative to conventional systems. For example, Bézier curves of conventional systems require significant time, user interactions, and computational resources to modify Bezier curves that approximate circular arc segments. In contrast, the digital arc design system can efficiently modify an arc segment in a sequence of design elements (while maintaining dynamic continuity constraints and arc qualities) with a drag-and-drop input corresponding to an endnode of the circular arc segment.

To illustrate, in some embodiments, the disclosed systems generate a circular arc segment comprising a first endnode and second endnode that is connected to a design segment comprising the second endnode and a third endnode (the circular arc segment and the design segment are connected at the second endnode). In one or more embodiments, digital arc design system generates an arc path segment comprising two interconnected circular arc segments. In one or more embodiments, the disclosed systems determine a first continuity setting for the first endnode, a second continuity setting for the second endnode, and a third continuity setting for the third endnode. Furthermore, in response to a user interaction via a user interface of a client device, the disclosed systems move the second endnode to a new location and generate a modified circular arc segment and a modified design segment according to the first continuity setting, the second continuity setting, and the third continuity setting. When creating the modified circular arc segment, the disclosed systems maintain the representation of the circular arc segment as a circular arc segment without converting the circular arc segment to another representation such as a Bézier curve. In this way, the disclosed systems provide a straightforward graphical user interface for manipulating circular arc segments within an arc path segment.

In addition, in one or more embodiments, the digital arc design system 106 generates and provides a rigid continuity conversion shape (e.g., for transitioning between continuity settings at different endnodes). In particular, the digital arc design system generates an arc path segment which comprises a circular arc segment connected to another design segment via an endnode. In addition, the digital arc design system generates a rigid continuity conversion shape comprising locations where the endnode is compatible with a rigid continuity setting. Additionally, in one or more implementations, in response to a user interaction, the digital arc design system moves the endnode to a position on the rigid continuity conversion shape. Furthermore, in one or more implementations, after the user device moves the endnode onto the rigid continuity conversion shape, the digital arc design system converts the continuity setting of the endnode from a flexible continuity setting to a rigid continuity setting.

As also mentioned, in one or more embodiments, the digital arc design system maintains both geometric continuity and/or tangential continuity when modifying the arc path segment. For example, the digital arc design system modifies the arc path segment while maintaining the geometric continuity by maintaining the connection at an interconnected endnode between a circular arc path segment and an additional design segment. In addition, the digital arc design system modifies the arc path segment while maintaining the tangential continuity by maintaining the congruency of incoming and outgoing tangent angles at the interconnected endnode between a circular arc path segment and an additional design segment.

Furthermore, in one or more embodiments, the digital arc design system snaps the endnode to the rigid continuity conversion shape to align (or snap) the endnode to a position on the rigid continuity conversion shape as the endnode is moved. Relatedly, in one or more embodiments, the digital arc design system restricts (or snaps) the endnode to positions on the rigid continuity conversion shape when the endnode is moved (e.g., along the rigid continuity conversion shape). In a similar fashion, in one or more embodiments, the digital arc design system generates a new circular arc segment and snaps the new circular arc segment to at least one of a radius, a center, or a tangent of the circular arc segment.

Additional detail regarding the digital arc design system will now be provided with reference to the figures. For example, FIG. 1 illustrates a schematic diagram of an exemplary system environment ("environment") 100 in which a digital arc design system 106 operates. As illustrated in FIG. 1, the environment 100 includes server device(s) 102, a network 108, client devices 110a-110n, and a digital document repository 114.

Although the environment 100 of FIG. 1 is depicted as having a particular number of components, the environment 100 is capable of having any number of additional or alternative components (e.g., any number of servers, client devices, or other components in communication with the digital arc design system 106 via the network 108). Similarly, although FIG. 1 illustrates a particular arrangement of the server device(s) 102, the network 108, and the client devices 110a-110n, various additional arrangements are possible.

The server device(s) 102, the network 108, and the client devices 110a-110n are communicatively coupled with each other either directly or indirectly (e.g., through the network 108 discussed in greater detail below in relation to FIG. 13). Moreover, the server device(s) 102 and the client devices 110a-110n include one of a variety of computing devices (including one or more computing devices as discussed in greater detail with relation to FIG. 13).

As illustrated in FIG. 1, the environment 100 includes the server device(s) 102. The server device(s) 102 generates, tracks, stores, processes, receives, and transmits electronic data, including digital design documents. A digital design document is an electronic file or record that contains document design elements (e.g., digital designs including circular arc segments) represented in a digital format. Thus, for example, a digital design document can include a digital document that includes one or more vector design elements. The server device(s) 102 can further access and utilize the digital document repository 114 to store and retrieve information such as digital design documents. The digital document repository 114 can be a local or remote repository for digital design documents.

For example, the server device(s) 102 receives or monitors interactions across the client devices 110a-110n. In some implementations, the server device(s) 102 transmit content to the client devices 110a-110n to cause the client devices 110a-110n to display content associated with digital design documents. For example, the server device(s) 102 can present digital design document to client device 110a and display the digital design document on the client devices 110a-110n with the digital design document displayed corresponding to system need (e.g., provide a digital design document for display via client applications 112a-112n).

Additionally, the server device(s) 102 includes all, or a portion of, the digital arc design system 106. For example, the digital arc design system 106 operates on the server device(s) 102 to access digital design documents, determine digital design element changes, and provide localization of element changes to the client devices 110a-110n. In one or more embodiments, via the server device(s) 102, the digital arc design system 106 generates and displays digital design documents based on manipulation of elements within the digital design documents. Example components of the digital arc design system 106 will be described below with regard to FIG. 11.

Furthermore, as shown in FIG. 1, the illustrated system includes the client devices 110a-110n. In some embodiments, the client devices 110a-110n include, but are not limited to, mobile devices (e.g., smartphones, tablets), laptop computers, desktop computers, or another type of computing devices, including those explained below in reference to FIG. 13. Some embodiments of client devices 110a-110n are operated by a user to perform a variety of functions via respective client applications 112a-112n. The client devices 110a-110n include one or more applications (e.g., the client applications 112a-112n) that can access, edit, modify, store, and/or provide, for display, digital design documents. For example, in some embodiments, the client applications 112a-112n include a software application installed on the client devices 110a-110n. In other cases, however, the client applications 112a-112n include a web browser or other application that accesses a software application hosted on the server device(s) 102.

The digital arc design system 106 can be implemented in whole, or in part, by the individual elements of the environment 100. Indeed, as shown in FIG. 1 the digital arc design system 106 can be implemented with regard to the server device(s) 102 and/or at the client devices 110a-110n. In particular embodiments, the digital arc design system 106 on the client devices 110a-110n comprises a web application, a native application installed on the client devices 110a-110n (e.g., a mobile application, a desktop application, a plug-in application, etc.), or a cloud-based application where part of the functionality is performed by the server device(s) 102.

In additional or alternative embodiments, the digital arc design system 106 on the client devices 110a-110n represents and/or provides the same or similar functionality as described herein in connection with the digital arc design system 106 on the server device(s) 102. In some implementations, the digital arc design system 106 on the server device(s) 102 supports the digital arc design system 106 on the client devices 110a-110n.

In some embodiments, the digital arc design system 106 includes a web hosting application that allows the client devices 110a-110n to interact with content and services hosted on the server device(s) 102. To illustrate, in one or more implementations, the client devices 110a-110n accesses a web page or computing application supported by the server device(s) 102. The client devices 110a-110n provides input to the server device(s) 102 (e.g., selected content items). In response, the digital arc design system 106 on the server device(s) 102 generates/modifies a digital design document. The server device(s) 102 then provides the digital design document to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server device(s) 102, bypassing the network 108. As another example, the environment 100 includes a third-party server comprising a content server and/or a data collection server.

Figure 2:
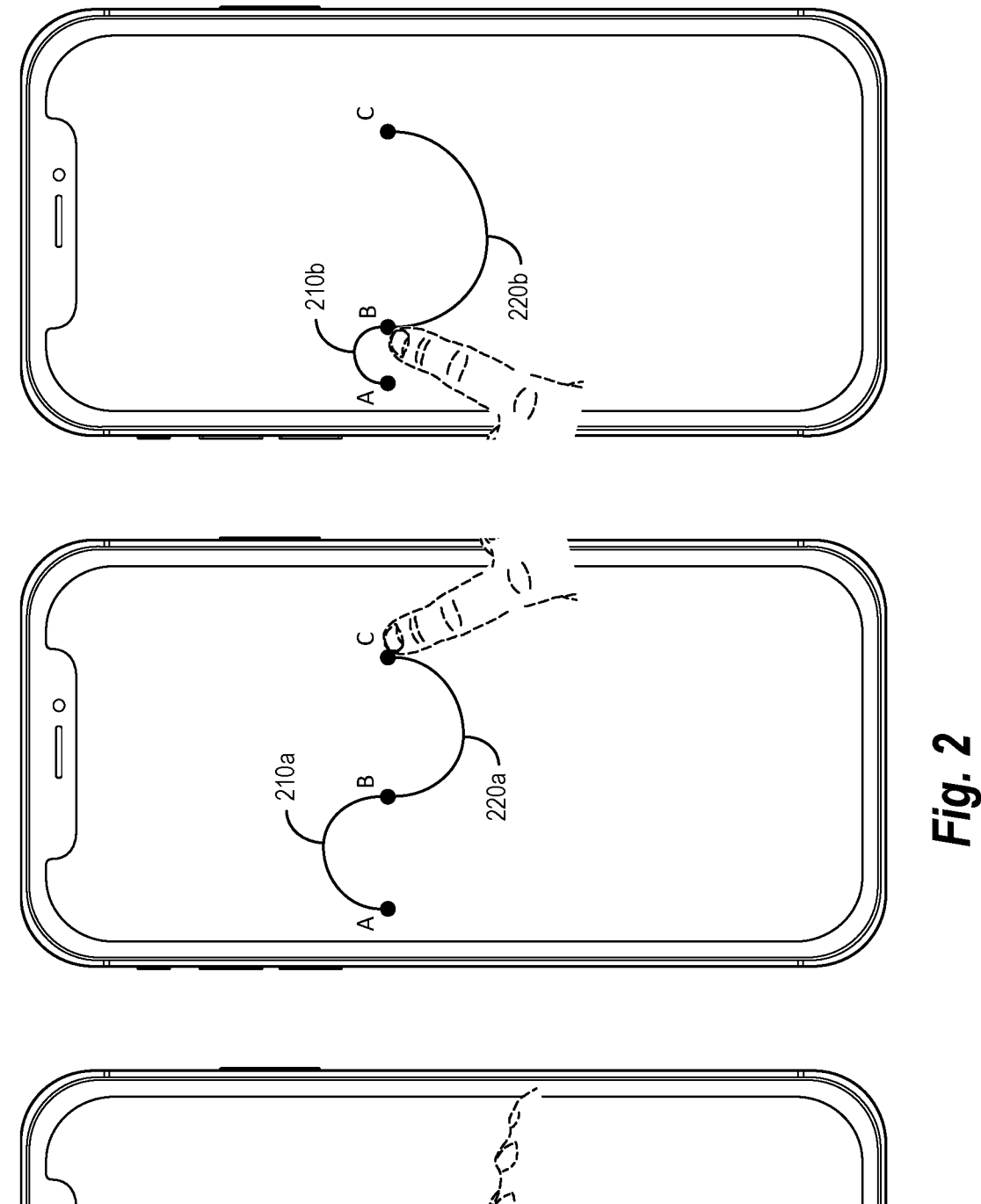
FIG. 2 illustrates an example overview of using a graphical user interface to generate and modify a circular arc segment of a digital design document in accordance with one or more embodiments.

As previously mentioned, in one or more embodiments, the digital arc design system 106 generates and modifies digital design content including circular arc segments utilizing an intuitive graphical user interface. For instance, FIG. 2 illustrates an overview diagram of the digital arc design system 106 generating and modifying a circular arc segment of a digital design document in accordance with one or more embodiments. Additional detail regarding the various acts of FIG. 2 is provided thereafter with reference to subsequent figures.

As shown in FIG. 2, the digital arc design system 106 generates a circular arc segment 210*a* comprising an endnode A and an endnode B. In particular, in one or more embodiments, the digital arc design system 106 determines and creates, through user interaction with a client device, a circular arc segment 210*a* that is bounded by endnode A and endnode B. As shown, the circular arc segment 210*a* comprises a portion of a circle and is a curved arc connecting starting and ending endnodes (e.g., the final point of the arc where the curve terminates).

Notably, the circular arc segment 210*a* is defined and represented within the graphical user interface and the graphic application as a circular arc segment. In particular, the position of the endnode A and the endnode B determine the length and position of the circular arc segment 210*a* in relation to a circle. Furthermore, the arc radius of the circular arc segment 210*a* is the distance from the centerpoint of the circle to any point on the circular arc segment 210*a* and remains constant throughout the circular arc segment 210*a*. Thus, a circular arc segment is a digital design element defined by circular features such as a center point and radius/diameter (and/or a center point and radial arc). Moreover, the circular arc segment 210*a* maintains the properties of the circle and can be described using geometric equations for a circle.

Markedly, the digital arc design system 106 does not create or modify the circular arc segment 210*a* as a Bézier curve. For example, a Bézier curve is represented within a graphical interface by a set of control points that influence its shape (not using two endnodes, a radius, and a centerpoint). Further, a Bézier curve is represented using polynomial equations, such as a cubic Bézier curve (3 control points) or a higher-degree Bézier curve (i.e., with more control points). The number and position of control points directly influence the shape and behavior of the curve, therefore a Bézier curve requires multiple parameters to define the intricacy of its shape.

As further shown in FIG. 2, the digital arc design system 106 determines and creates a design segment 220*a* comprising endnode B and endnode C. The design segment 220*a* includes a digital design element having a geometric shape. For example, the design segment 220*a* can include shapes such as lines, arcs, circles, ellipses, polygons, Bézier curves, and other similar objects. As shown, in one or more embodiments, the design segment 220*a* is a circular arc segment that is created with the same arc constraints as described above for the circular arc segment 210*a*. As shown, the digital arc design system 106 combines the circular arc segment 210*a* with the design segment 220*a* to create an arc path segment. In particular, the digital arc design system 106 creates the arc path segment by creating a single sequential path from the circular arc segment 210*a* and design segment 220*a* interconnected at endnode B.

In one or more embodiments, the arc path segment is transformed and edited within the digital arc design system 106. For example, the digital arc design system 106 selects, moves, scales, rotates, and manipulates the arc path segment to modify qualities of the circular arc segment 210*a* and the design segment 220*a* such as the endnodes, position, size, orientation, and/or other attributes. As further shown in FIG. 2, the digital arc design system 106, based on user device interaction with the combined arc path segment, provides the modified circular arc segment 210*b* and modified design segment 220*b*. In particular, the digital arc design system 106 modifies the combined arc path segment by moving the endnode B to a new location and adjusting the circular arc segment 210*a* and the design segment 220*a* while maintaining the attributes of an arc for the modified circular arc segment 210*b* (i.e., without converting the circular arc segment 210*a* to a Bezier curve or other non-arc, vector curve representation).

As mentioned above, the digital arc design system 106 utilizes rigid and flexible continuity settings at the endnodes of an arc path segment to create a modified arc path segment. FIGS. 3A-3B illustrate an overview of the digital arc design system 106 utilizing rigid endnodes and non-rigid endnodes in accordance with one or more embodiments.

The arc path segment shown on FIGS. 3A-3B comprises a circular arc segment 310*a* connected to a circular arc segment 320*a* at endnode B, which includes an incoming tangent angle and an outgoing tangent angle at the endnode B. Notably, as mentioned and selected by menu item 332, the circular arc segment 320*a* can be switched for another digital design element (e.g., swapped for a different a geometric form, such as a line, arc, circle, ellipse, polygon, or Bézier curve).

The tangent angle of the circular arc segment 310*a* is an incoming tangent angle that refers to the angle formed by a tangent line at the circular arc segment 310*a* (e.g., relative to a horizontal angle). In particular, the associated tangent line is a straight line perpendicular to the radius of the circular arc segment 310*a* that touches the circular arc segment 310*a* at the endnode B (exactly one point). Furthermore, the tangent angle is the angle formed by the tangent line to the circular arc segment 310*a* at the endnode B.

In addition, the tangent angle of the connected circular arc segment 320*a* is an outgoing tangent angle that is formed between the circular arc segment 320*a* and a tangent line at the endnode B (e.g., tangent to the circular arc segment 320*a*). Specifically, it refers to the angle formed by the tangent line at the endnode B of the circular arc segment 320*a*. The digital arc design system 106 utilizes a comparison of the incoming and outgoing tangent angles to determine tangential continuity at the endnode B.

The relationship between the incoming tangent angle and outgoing tangent angle can determine the continuity at the interconnected endnode B (e.g., rigid or flexible continuity). By adjusting the incoming and outgoing tangent angles (and the relationship between the incoming and outgoing tangent angles), the digital arc design system 106 achieves visually pleasing and functionally appropriate transitions to maintain (or disrupt) the curvature of the combined arc path segment at endnode B.

To illustrate, as shown in FIGS. 3A-3B, the digital arc design system 106 generates an arc path segment comprising the circular arc segment 310*a*, circular arc segment 320*a*, endnode A, endnode B, and endnode C. As also shown, and selected by menu option 334*a*, the digital arc design system 106 generates an arc path segment with a sharp visual bend at endnode B (e.g., a tangent discontinuity). As further shown, the digital arc design system 106 modifies the arc path segment based on a continuity setting (e.g., utilizing a "Continuity" menu). Specifically, as shown in FIG. 3A and based on a flexible continuity setting (e.g., "Flex" menu option 330*a*), the digital arc design system 106 generates a flexible endnode B via the user interface where the incoming and outgoing tangent angles are flexible and constrained to geometric continuity (e.g., a shared geometric point in space), but not constrained to tangent continuity (e.g., the tangent angles are not required to be congruent). Specifically, an incoming tangent angle $\alpha$ and outgoing tangent angle $\beta$ at endnode B are such that $\alpha = B \backslash / \alpha \neq \beta$.

Further, as shown in FIG. 3B and based on a rigid continuity setting (e.g., "Rigid" menu option 330b), the digital arc design system 106 provides a user interface to generate a rigid endnode B where the incoming and outgoing tangent angles are constrained to be congruent angles. Specifically, an incoming tangent angle $\alpha$ and outgoing tangent angle $\beta$ at endnode B are such that $\alpha = \beta$.

For instance, angle congruency between tangent angles refers to the equality (or near equality, within a threshold) of associated incoming and outgoing tangent angles. When two tangent angles have the same measure (or within a threshold difference), they are congruent. For example, congruent incoming and outgoing tangent angles have the same measure, meaning they share the same angle relative to a reference point (e.g., a horizontal line). Furthermore, a first tangent angle that is 180 degrees different from a second tangent angle can be considered congruent to the second tangent angle. Specifically, as defined by the digital arc design system 106, congruent tangent angles have the same measure, regardless of whether the difference between their measure is 0 degrees, 180 degrees, or another multiple of 180 degrees.

As further shown, the digital arc design system 106 utilizes the continuity setting to control the congruency between incoming and outgoing tangent angles at the endnode B of the combined arc path segment. In particular, as shown in FIG. 3A, when a flexible continuity setting is selected, the digital arc design system 106 allows the user application to break or disrupt tangent continuity (e.g., angle congruency) between the incoming and outgoing tangent lines at the endnode B.

For example, as mentioned, the digital arc design system 106 generates the arc path segment comprising the circular arc segment 310a connected to the circular arc segment 320a at endnode B. Further, the digital arc design system 106 modifies the arc path segment to determine a modified circular arc segment 310b and a modified circular arc segment 320b. As shown, the digital arc design system 106 maintains the qualities of a circular arc for the modified circular arc segment 310b and modified circular arc segment 320b, and maintains the geometric continuity at endnode B, but does not constrain the tangential continuity at endnode B. Specifically, the modified circular arc segment 310b and the modified circular arc segment 320b remain interconnected at endnode B, but the tangent angles are not constrained to be a specific value. Notably, as shown, utilizing a flexible congruency setting at the endnode B can result in a noticeable change in the curvature or direction of the curve at the endnode B, which includes sharp corners or transitions despite allowing more flexibility in the positioning of endnode B.

Conversely, as shown in FIG. 3B, when a rigid continuity setting is selected, the digital arc design system 106 constrains the congruency of the incoming and outgoing tangent angles at the endnode B. For example, as shown and selected by menu option 334b, the digital arc design system 106 generates an arc path segment that is visually smooth at endnode B. Further, the digital arc design system 106 modifies the arc path segment based on a rigid continuity setting (e.g., "Rigid" menu option 330b) and generates a rigid endnode B via the user interface where the incoming and outgoing tangent angles are rigid and constrained to be congruent (i.e., a tangent continuity).

To illustrate, the digital arc design system 106 determines an arc path segment comprising a circular arc segment 340a connected to a circular arc segment 350a at endnode B. Further, the digital arc design system 106 modifies the arc path segment to determine a modified circular arc segment 340b and a modified circular arc segment 350b. As shown, the digital arc design system 106 maintains the qualities of a circular arc for the modified circular arc segment 340b and the modified circular arc segment 350b, maintains the geometric continuity at endnode B, and maintains the tangent continuity at endnode B. Specifically, the modified circular arc segment 340b and the modified circular arc segment 350b remain interconnected at endnode B, and the incoming/outgoing tangent angles are constrained to be congruent values. Notably, as shown, utilizing a rigid congruency setting at the endnode B results in a smooth and continuous transition at the endnode B. Specifically, the digital arc design system maintains congruent tangent angles (and the visual curvature of the design element) at the selected endnode B with a rigid continuity setting.

To illustrate, in one or more implementations, the digital arc design system 106 generates the circular arc segment 310a connected to the circular arc segment 320a at endnode B. For instance, the digital arc design system 106 can identify a first user interaction starting the new circular arc segment 310a at endnode A. Upon detecting the selection of endnode A and movement to a new position (e.g., generated by the movement of a cursor or finger), the digital arc design system 106 can generate and display endnode B and the circular arc segment 310a. Furthermore, upon detecting an additional selection of endnode B and movement to a new position (e.g., generated by the movement of a cursor or finger), the digital arc design system 106 can generate and display endnode C and the circular arc segment 350a. In addition, upon detecting an additional selection of endnode B and movement of endnode B to a new position (e.g., generated by the movement of a cursor or finger), the digital arc design system 106 can generate and display the modified circular arc segment 340b and the modified circular arc segment 350b interconnected at endnode B based on the selected continuity setting as described above.

As mentioned, in some implementations the digital arc design system 106 utilizes a rigid continuity conversion shape to display locations where an endnode of an arc path segment is compatible with a rigid continuity setting. FIGS. 4A-4B illustrate an example overview of modifying an arc path segment with a flexible endnode and a rigid endnode utilizing a rigid continuity conversion shape in accordance with one or more embodiments.

As shown in FIG. 4A, in one or more implementations, the digital arc design system 106 displays a rigid continuity conversion shape 430. For example, the digital arc design system 106 provides a rigid continuity conversion shape 430 to display locations where endnode B of the arc path segment, comprising circular arc segment 410a and circular arc segment 420a (or design segment), is compatible with a rigid continuity setting. In particular, the digital arc design system 106 displays the rigid continuity conversion shape 430 to provide reference points (or a guide) for possible positions where the interconnected endnode B of the combined arc path segment maintains a rigid endnode and can be converted to a rigid continuity setting. Indeed, the digital arc design system 106 facilitates the design process by displaying the rigid continuity conversion shape 430 where the endnode B is a rigid endnode and can be converted to a rigid continuity setting while maintaining the arc properties of the circular arc segment 410a to present a visually pleasing and continuous curve.

To illustrate, the digital arc design system 106 provides the rigid continuity conversion shape 430 as a guide, by providing the functionality to change from a rigid continuity setting and a flexible continuity setting (or vice versa) at the location of the rigid continuity conversion shape 430. Further, the digital arc design system 106 moves the endnode B of the arc path segment comprising circular arc segment 410a and circular arc segment 420a to a new position and determines a modified circular arc segment 410b and a modified circular arc segment 420b (or design segment). As shown, the digital arc design system 106 maintains the qualities of a circular arc segment for the modified circular arc segment 410b and modified circular arc segment 420b, and maintains the geometric continuity at endnode B, but does not constrain the tangential continuity at endnode B. Specifically, the modified circular arc segment 410b and the modified circular arc segment 420b remain interconnected at endnode B, but the tangent angles are not constrained to specific values.

In contrast, when the digital arc design system 106 modifies the arc path segment to determine a modified circular arc segment 410c and a modified circular arc segment 420c, the digital arc design system 106 moves (e.g., snaps when within a threshold distance) the endnode B to the rigid continuity conversion shape 430. In this instance, the digital arc design system 106 maintains the qualities of a circular arc for the modified circular arc segment 410c, maintains the geometric continuity at endnode B, and maintains the tangential continuity at endnode B. Indeed, the digital arc design system 106 determines the modified circular arc segment 410c and the modified circular arc segment 420c remain interconnected at endnode B, and the incoming/outgoing tangent angles are constrained to be congruent values on positions of the rigid continuity conversion shape 430.

As further shown on FIG. 4B, the digital arc design system 106 modifies the arc path segment comprising circular arc segment 440a and circular arc segment 450a (or design segment) to determine a modified circular arc segment 440b and a modified circular arc segment 450b utilizing a rigid continuity setting. As shown, the digital arc design system 106 constrains the positions of the endnode B to be along the rigid continuity conversion shape 460. In this instance, the digital arc design system 106 maintains the qualities of a circular arc for the modified circular arc segment 440b and modified circular arc segment 450b, maintains the geometric continuity at endnode B, and also maintains the tangential continuity at endnode B. Indeed, the digital arc design system 106 determines the modified circular arc segment 440b and the modified circular arc segment 450b remain interconnected at endnode B, and the incoming/outgoing tangent angles are constrained to be congruent values along the rigid continuity conversion shape 430.

Furthermore, in one or more implementations, the digital arc design system utilizes a snapping functionality. For example, by automatically aligning, connecting, and/or restricting the endnodes of the circular arc segments to the rigid continuity conversion shape 430, the digital arc design system 106 facilitates the precise positioning of design elements within a design application. For example, in one or more implementations, the digital arc design system 106 snaps the endnode B to the rigid continuity conversion shape 430. To illustrate, the digital arc design system 106 snaps the endnode B to the rigid continuity conversion shape 430 based on an indication from the user device to convert the endnode B to a rigid endnode, based on the proximity of the endnode B to the rigid continuity conversion shape 430, based on a selection of the rigid continuity conversion shape 430, and/or based on other factors. Additionally, in one or more implementations, the digital arc design system 106 maintains the position (or maintains the snap) of endnode B on the rigid continuity conversion shape 430 to maintain the endnode B as a rigid endnode.

Figure 5A:
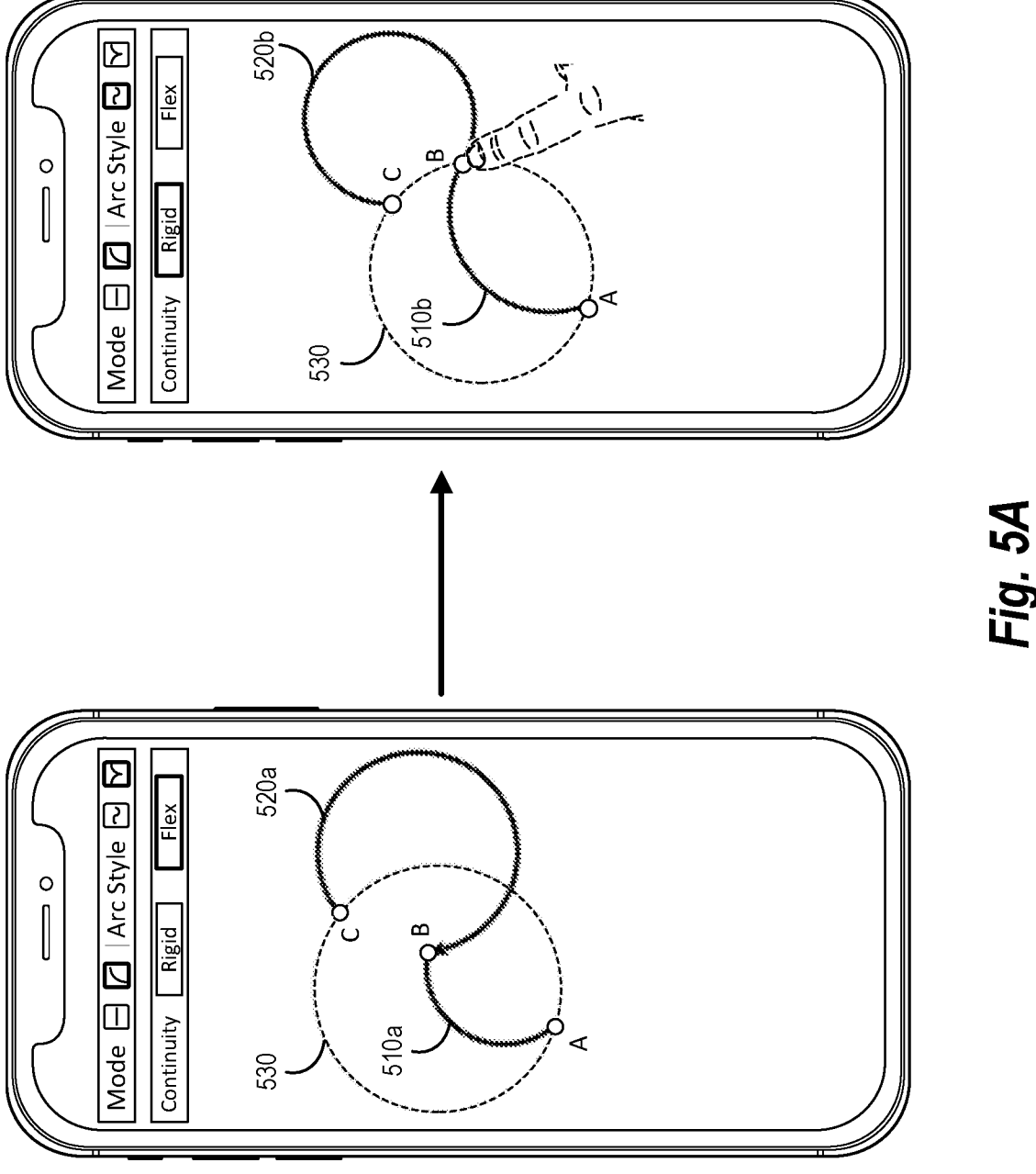
FIGS. 5A-5C illustrate example flows and computer-implemented algorithms for modifying an arc path segment with a flexible-flexible-flexible continuity setting to a flexible-rigid-flexible continuity setting in accordance with one or more embodiments.
Figure 5B:
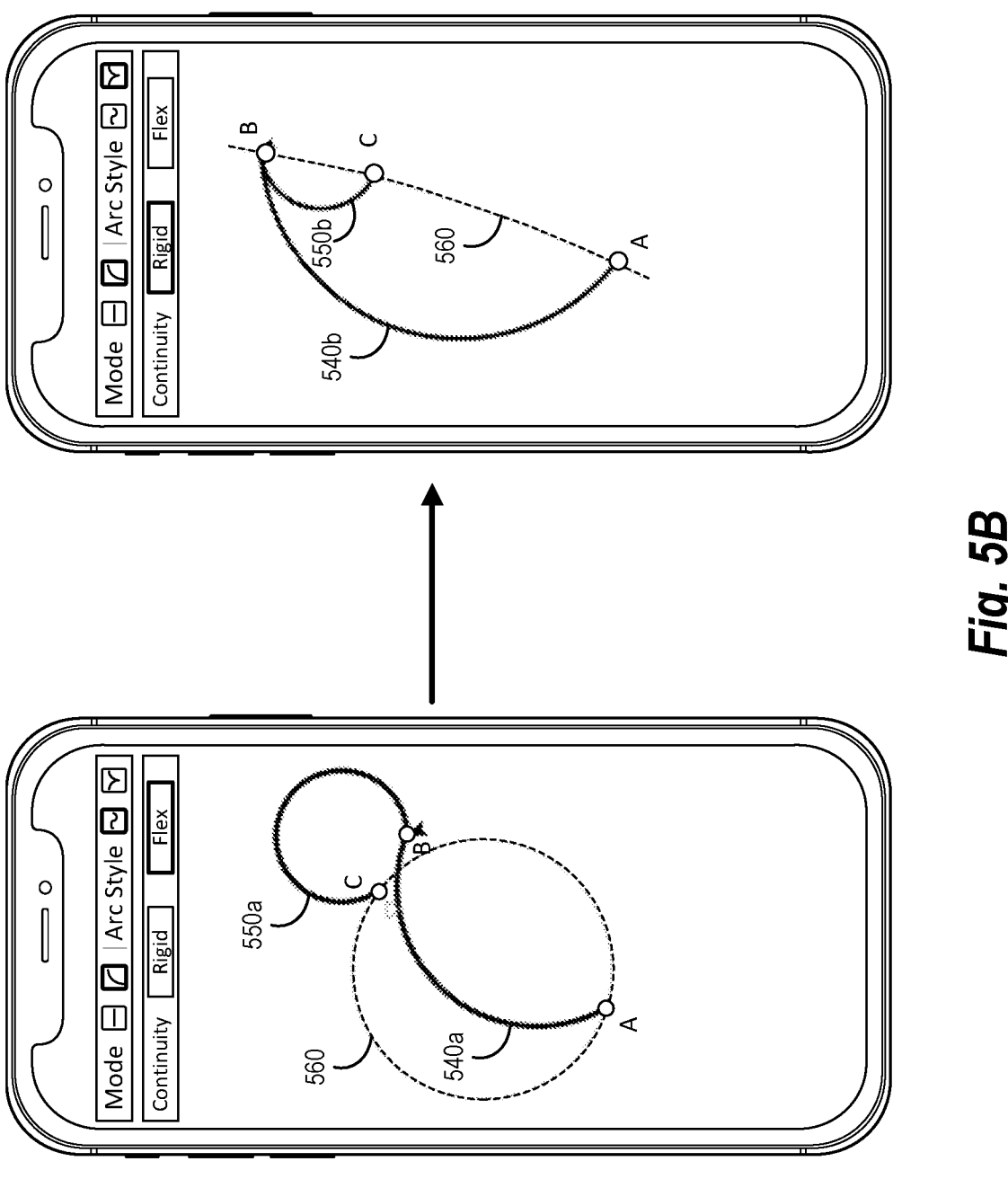

As mentioned, when editing arc path segments comprising a circular arc segment interconnected with an additional design segment, there are multiple editing scenarios for the continuity settings of the three endnodes A, B, and C (e.g., the circular arc segment endnode, the interconnected endnode, and the additional design segment endnode). Possible editing scenarios include a flexible-flexible-flexible continuity setting, a flexible-rigid-flexible continuity setting, a rigid-flexible-rigid continuity setting, a rigid-rigid-rigid continuity setting, a rigid-flexible-flexible continuity setting, and a rigid-rigid-flexible continuity setting. FIGS. 5A-5C, 6A-6C, 7A-7B, and 8A-8B illustrate examples of the digital arc design system 106 utilizing these editing scenarios. In particular, FIGS. 5A-5B illustrate example flows and computer-implemented algorithms for modifying an arc path segment with a flexible-flexible-flexible continuity setting to a flexible-rigid-flexible continuity setting in accordance with one or more embodiments.

As shown in FIG. 5A, the digital arc design system 106 generates an arc path segment comprising flexible endnode A, flexible endnode B (connecting circular arc segment 510a and circular arc segment 520a), and flexible endnode C. Thus, the arc path segment represents an arc path segment with a flexible-flexible-flexible continuity setting for endnodes A-B-C. When all the endnodes are flexible, and the digital arc design system 106 maintains flexible continuity at endnode B and the digital arc design system 106 imposes no limitations regarding possible positions for endnode B. However, the digital arc design system 106 utilizes the limited set of positions where the digital arc design system 106 can convert the endnode B to a rigid flexibility setting. In particular, the digital arc design system 106 determines possible positions where the endnode B can be maintained as a rigid endnode (and where a rigid continuity setting is possible) and displays the positions as a rigid continuity conversion shape 530. For example, with fixed positions for flexible endnode A and flexible endnode C, the digital arc design system 106 determines a limited set of possible positions (on the rigid continuity conversion shape 530) where endnode B could be placed by the digital arc design system 106 for the incoming and outgoing tangents of endnode B to be congruent.

As mentioned, in one or more embodiments, the digital arc design system 106 measures the incoming tangent angle and outgoing tangent angle to be congruent. To illustrate, in FIG. 5A, when the digital arc design system 106 modifies the arc path segment comprising circular arc segment 510a and circular arc segment 520a (or design segment) to determine a modified circular arc segment 510b and a modified circular arc segment 510b, the digital arc design system 106 moves the endnode B to the rigid continuity conversion shape 530. In this instance, the digital arc design system 106 maintains the qualities of a circular arc for the modified circular arc segment 510b and modified circular arc segment 520b, maintains the geometric continuity at endnode B, and converts to tangential continuity at endnode B (rigid continuity). Furthermore, as shown in FIG. 5A, the tangential continuity is 0 degrees (e.g., selected by the "Arc Style" menu) which achieves a congruent and visually pleasing and smooth transition at endnode B.

As another example, in FIG. 5B, when the digital arc design system 106 modifies the arc path segment comprising circular arc segment 540*a* and circular arc segment 550*a* (or design segment) to determine a modified circular arc segment 540*b* and a modified circular arc segment 550*b*, the digital arc design system 106 moves the endnode B to the rigid continuity conversion shape 560. In this instance, the digital arc design system 106 maintains the qualities of a circular arc for the modified circular arc segment 540*b* and modified circular arc segment 550*b*, maintains the geometric continuity at endnode B, and converts to tangential continuity at endnode B (rigid continuity). Furthermore, as shown in FIG. 5B, the tangential continuity is 180 degrees (e.g., selected by the "Arc Style" menu) which achieves a congruent and visually pleasing corner transition at endnode B.

Figure 5C:
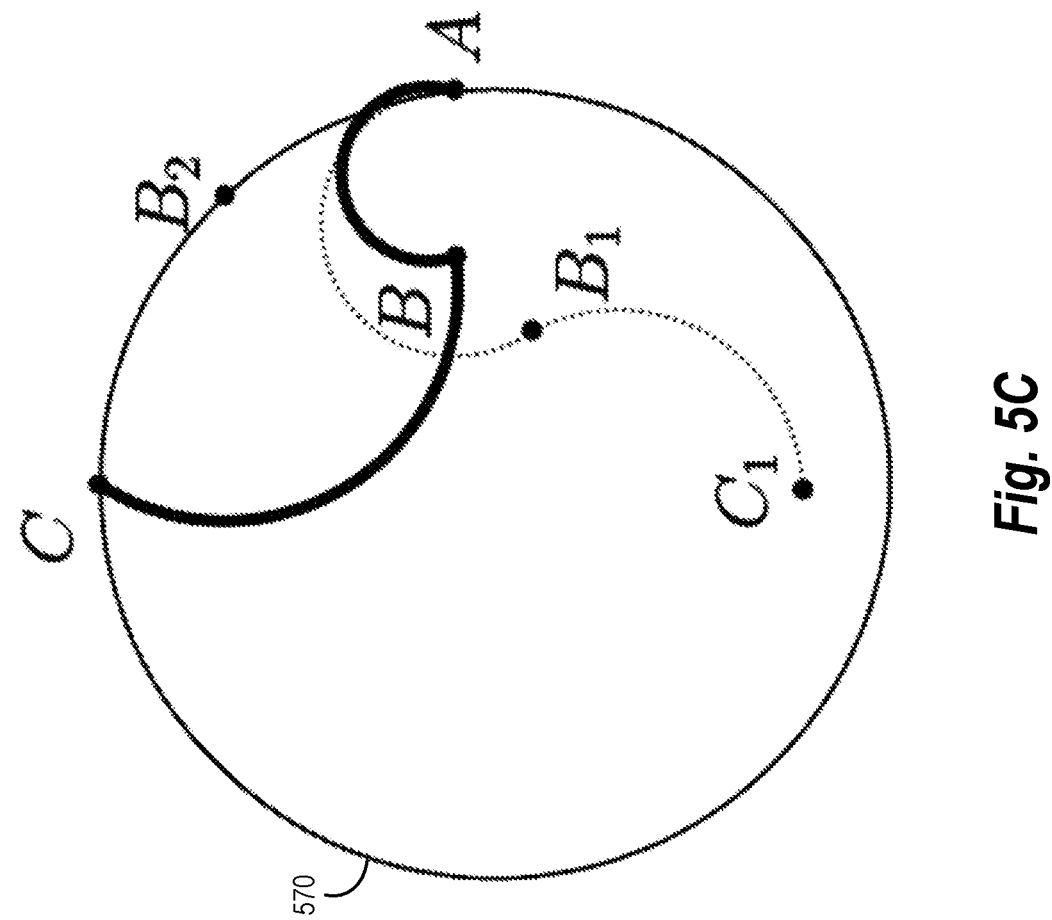

As further illustrated by FIG. 5C, the digital arc design system 106 generates and displays a rigid continuity conversion shape. In particular, if the angles of circular arc segments AB and BC are $\alpha$ and $\beta$, radius of circular arc segment AB is $r_1$ and distance AC=h, then the digital arc design system 106 defines some mid-variables as:

$$t_1 = \sin \alpha,$$
$$t_2 = \cos \alpha,$$
$$t_3 = \sin(\beta - \alpha),$$
$$t_4 = \cos(\beta - \alpha),$$
$$a = 1 - 2t_2 + t_2^2 + t_1^2,$$
$$b = 2r_1\left(t_1^2 + t_1 t_3 - t_2 + t_2^2 + t_4 - t_2 t_4\right),$$
$$c = r_1^2\left(t_1^2 + t_3^2 + t_4^2 + t_2^2 - 2t_2 t_4 + 2t_1 t_3\right) - h^2$$

To determine the radius of the circular arc segment BC, the digital arc design system 106 utilizes the square equation $ax^2 + bx + c = 0$. The digital arc design system 106 selects the positive value solution as the radius $r_2$. Since all the points with congruent tangents lie on the circle that is passing through A and B, the digital arc design system 106 determines a single such combination to find at least one more point on the circle.

In one or more embodiments, a radius $r_1$ is chosen as $$\frac{h}{4}$$

(other values can be used in the same manner, $$\frac{h}{4}$$

is just one possible option). Then, with the radius $r_2$ and arc angles $\alpha$ and $\beta$, the digital arc design system 106 determines the points $B_1$ and $C_1$. By rotating point $B_1$ by $\angle CAC_1$ the digital arc design system 106 determines point $B_2$ where the circular arc segments AB and BC share the same tangent. Thus, the digital arc design system 106 determines the value of a point on a circle with points A, $B_2$ and C. The digital arc design system 106 further determines additional points to determine the circle that passes through points A, $B_2$ and C and provide a rigid continuity design element 570 for display on a user device. In this way, the digital arc design system 106 determines a circle with positions compatible with a rigid continuity setting for the mid-point of the arc path segment AB. Indeed, the digital arc design system 106 determines solutions for a rigid continuity conversion shape when modifying an arc path segment with a flexible-flexible-flexible continuity setting to a flexible-rigid-flexible continuity setting.

Figure 6A:
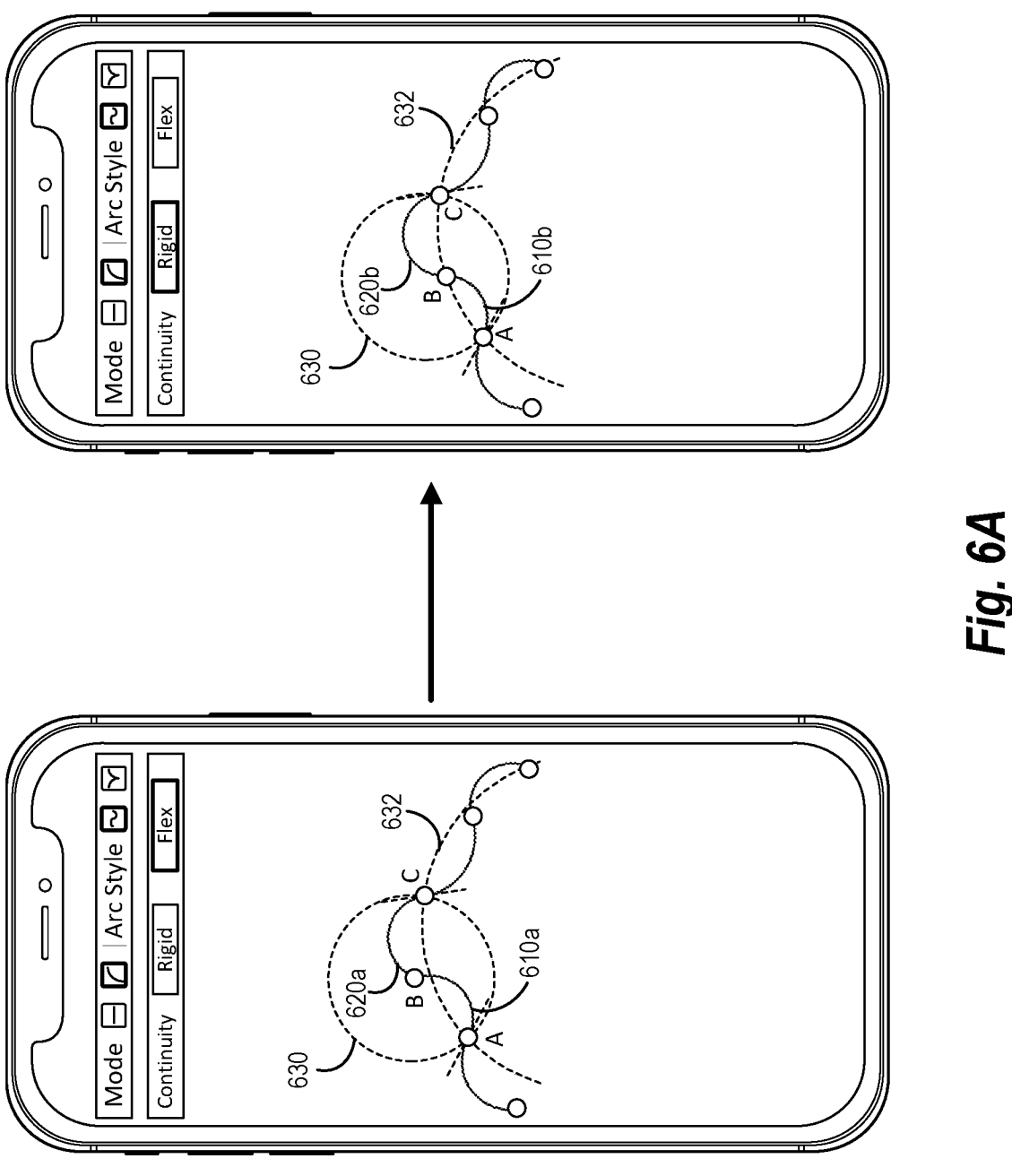
FIGS. 6A-6C illustrate example flows and computer-implemented algorithms for modifying an arc path segment with a rigid-flexible-rigid continuity setting to a rigid-rigid-rigid continuity setting in accordance with one or more embodiments.
Figure 6B:
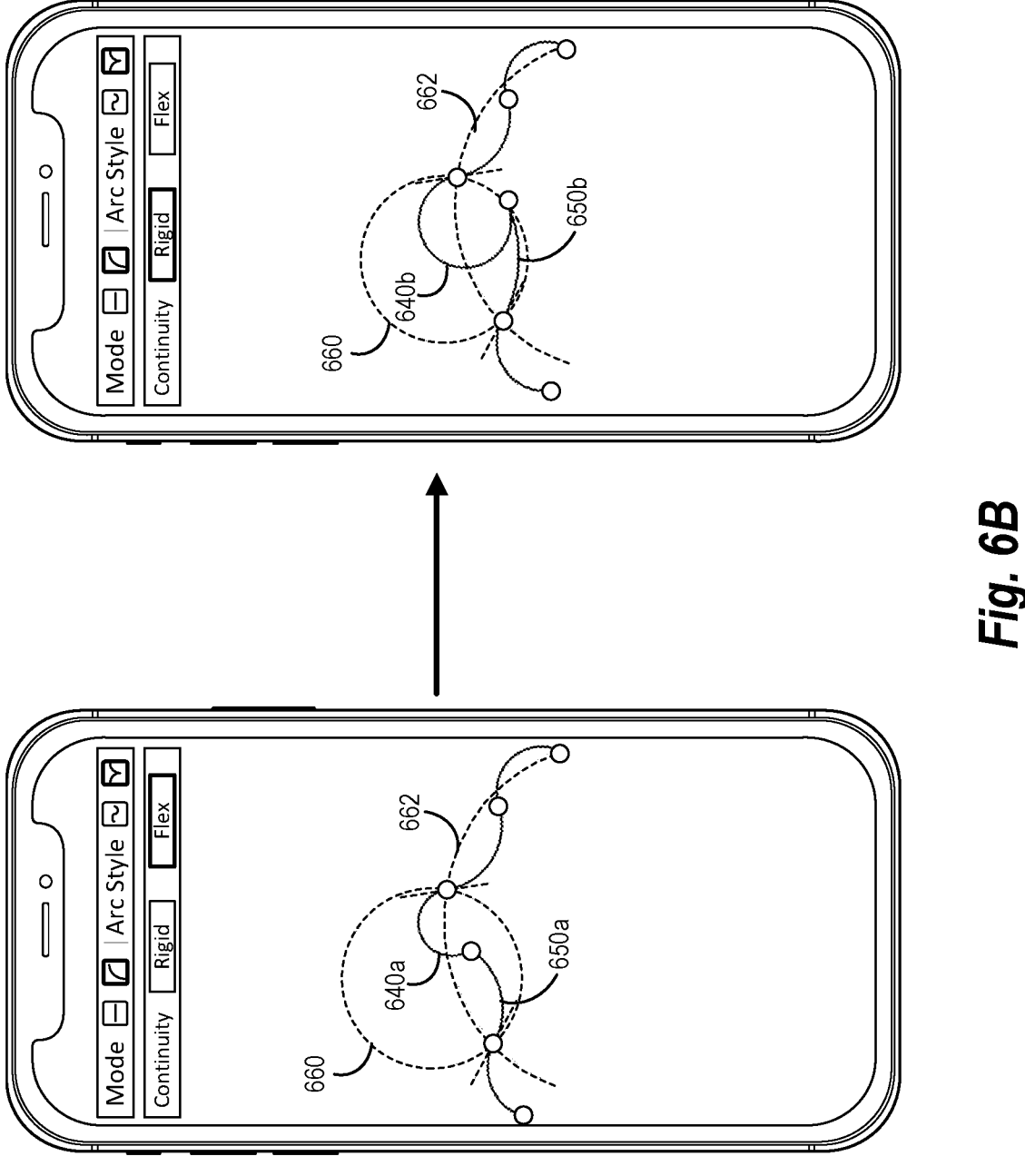
Figure 6C:
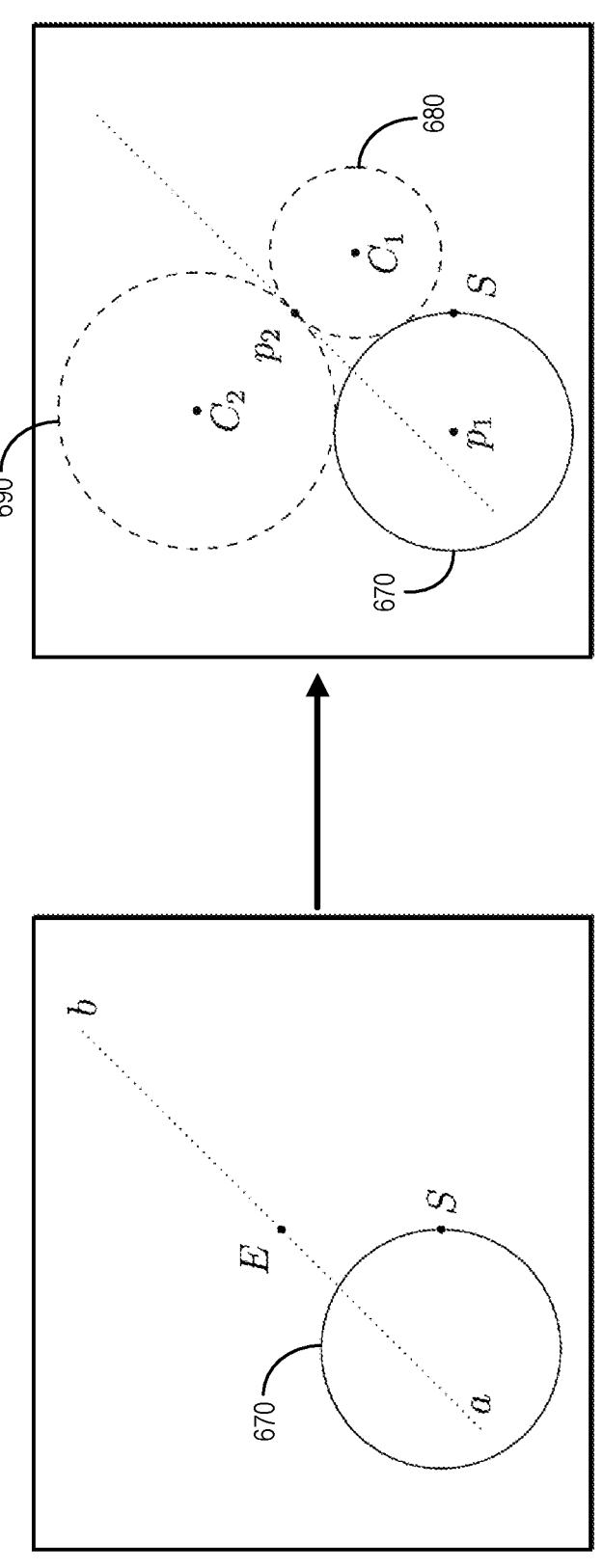

As mentioned, there are multiple editing scenarios for the continuity settings of the three endnodes A, B, and C of an arc path segment. FIGS. 6A-6C illustrate example flows and computer-implemented algorithms for modifying an arc path segment with a rigid-flexible-rigid continuity setting to a rigid-rigid-rigid continuity setting in accordance with one or more embodiments.

As shown, the digital arc design system 106 generates an arc path segment comprising rigid endnode A, flexible endnode B (connecting circular arc segment 610*a* and circular arc segment 620*a*), and rigid endnode C. Thus, the arc path segment represents an arc path segment with a rigid-flexible-rigid continuity setting for endnodes A-B-C. In particular, endnode A and endnode C are rigid, while endnode B is flexible. When the digital arc design system 106 maintains flexible continuity at endnode B, the digital arc design system 106 imposes no limitations regarding possible positions when moving endnode B. However, as shown, the digital arc design system 106 determines possible positions where the endnode B can be a rigid endnode (e.g., where rigid continuity is possible) and displays the positions as a rigid continuity conversion shape 630 and a rigid continuity conversion shape 632. In particular, with fixed positions of rigid endnode A and rigid endnode C, there is a limited set of positions (on the rigid continuity conversion shape 630 and the rigid continuity conversion shape 632) where endnode B could be placed by the digital arc design system 106 for the incoming and outgoing tangents of endnode B to be congruent. In particular, in this configuration, the positions form two circles: the rigid continuity conversion shape 630 and the rigid continuity conversion shape 632.

Similar to the above discussion, in one or more embodiments, the digital arc design system 106 measures the incoming tangent angle and outgoing tangent angle to be congruent if the difference between the angles is 0 degrees, 180 degrees, or any multiple of 180 degrees. To illustrate, in FIG. 6A, when the digital arc design system 106 modifies the arc path segment comprising circular arc segment 610*a* and circular arc segment 620*a* to determine a modified circular arc segment 610*b* and a modified circular arc segment 610*b*, the digital arc design system 106 moves the endnode B to the rigid continuity conversion shape 632. In this instance, the digital arc design system 106 maintains the qualities of a circular arc for the modified circular arc segment 610*b* and modified circular arc segment 620*b*, maintains the geometric continuity at endnode B, and converts to tangential continuity at endnode B (rigid continuity). Furthermore, as shown in FIG. 6A, the tangential continuity is 0 degrees (e.g., selected by the "Arc Style" menu) which achieves a congruent and visually pleasing and smooth transition at endnode B.

As further shown in FIG. 6B, when the digital arc design system 106 modifies the arc path segment comprising circular arc segment 640*a* and circular arc segment 650*a* to determine a modified circular arc segment 640*b* and a modified circular arc segment 650*b*, the digital arc design system 106 moves the endnode B to the rigid continuity conversion shape 660. In this instance, the digital arc design system 106 maintains the qualities of a circular arc for the modified circular arc segment 640*b* and modified circular arc segment 650*b*, maintains the geometric continuity at endnode B, and converts to tangential continuity at endnode B (rigid continuity). Furthermore, as shown in FIG. 6B, the tangential continuity is 180 degrees (e.g., selected by the "Arc Style" menu) which achieves a congruent and visually pleasing corner transition at endnode B.

As further illustrated by FIG. 6C, the digital arc design system 106 generates the rigid continuity conversion shape 630 and rigid continuity conversion shape 632. To illustrate, the digital arc design system 106 determines a circular arc segment that is part of circle 670, starting point S and destination point $p_2$ and destination tangent ab. The digital arc design system 106 determines two solutions for transitioning to a rigid continuity setting. In particular, the digital arc design system 106 determines the centers of the circle 680 and circle 690 (e.g., $C_1$ and $C_3$) as well as the radii of the circle 680 and circle 690 (e.g., $R_1$ and $R_2$) and touching points $X_1$ and $X_2$. The digital arc design system 106 utilizes $p_1$ as the center of circle 670, $r_1$ as the radius of circle 670, and $p_2$ as the destination point. The digital arc design system 106 defines a line perpendicular to ab that passes through $p_2$ by the equation $f(x)=m_2x+c_2$. In one or more embodiments, the digital arc design system 106 performs the following calculations to obtain square equation coefficients:

$$A = p_1 \cdot y^2 + p_1 \cdot x^2 - p_2 \cdot y^2 - p_2 \cdot x^2 + 2c_2(p_2 \cdot y - p_1 y) + r_1^2$$

$$B = m_2(p_2 \cdot y - p_1 \cdot y) + p_2 \cdot x - p_1 \cdot x$$

$$a = r_1^2 m_2^2 + r_1^2 - B^2$$

$$b = -2r_1^2 m_2 p_1 \cdot y + 2r_1^2 m_2 c_2 - 2r_1^2 p_1 \cdot x - AB$$

$$c = r_1^2 p_1 \cdot y^2 - 2r_1^2 p_1 \cdot y c_2 + r_1^2 c_2^2 + r_1^2 p_1 \cdot x^2 - \frac{A^2}{4}$$

The digital arc design system 106 utilizes the solution for square equation $ax^2+bx+c=0$ to obtain $x_1$ and $x_2$. In addition, the digital arc design system 106 determines the central points of the circle 680 and circle 690 as $C_1(x_1, f(x_1))$ and $C_2(x_2, f(x_2))$. Further, the radii of the circle 680 and circle 690 are determined by:

$$R_1 = \sqrt{(p_2 \cdot y - y_1)^2 + (p_2 \cdot x - x_1)^2}$$

$$R_2 = \sqrt{(p_2 \cdot y - y_2)^2 + (p_2 \cdot x - x_2)^2}$$

Utilizing the points $C_1$, $C_2$, $R_1$ and $R_2$, the digital arc design system 106 determines two points $d_1$ and $d_2$ for the circle intersections:

$$d_1 = p_1 + r_1 \frac{C_1 - p_1}{r_1 - R_1}$$

$$d_2 = p_1 + r_1 \frac{C_2 - p_1}{r_1 + R_2}$$

In one or more embodiments, the digital arc design system 106 utilizes $r_1$ is as a quarter of the distance between S and E.

To illustrate, the digital arc design system 106 utilizes the points {S, $d_1$, E} and {S, $d_2$, E} to build two circles that are used as guides for snapping and to display positions where the endnode B is compatible with a rigid continuity setting. Specifically, as shown in FIGS. 6A-6B the digital arc design system 106 creates and displays the rigid continuity conversion shape 630, rigid continuity conversion shape 632, rigid continuity conversion shape 660, and rigid continuity conversion shape 662 using the method described above.

Figure 7A:
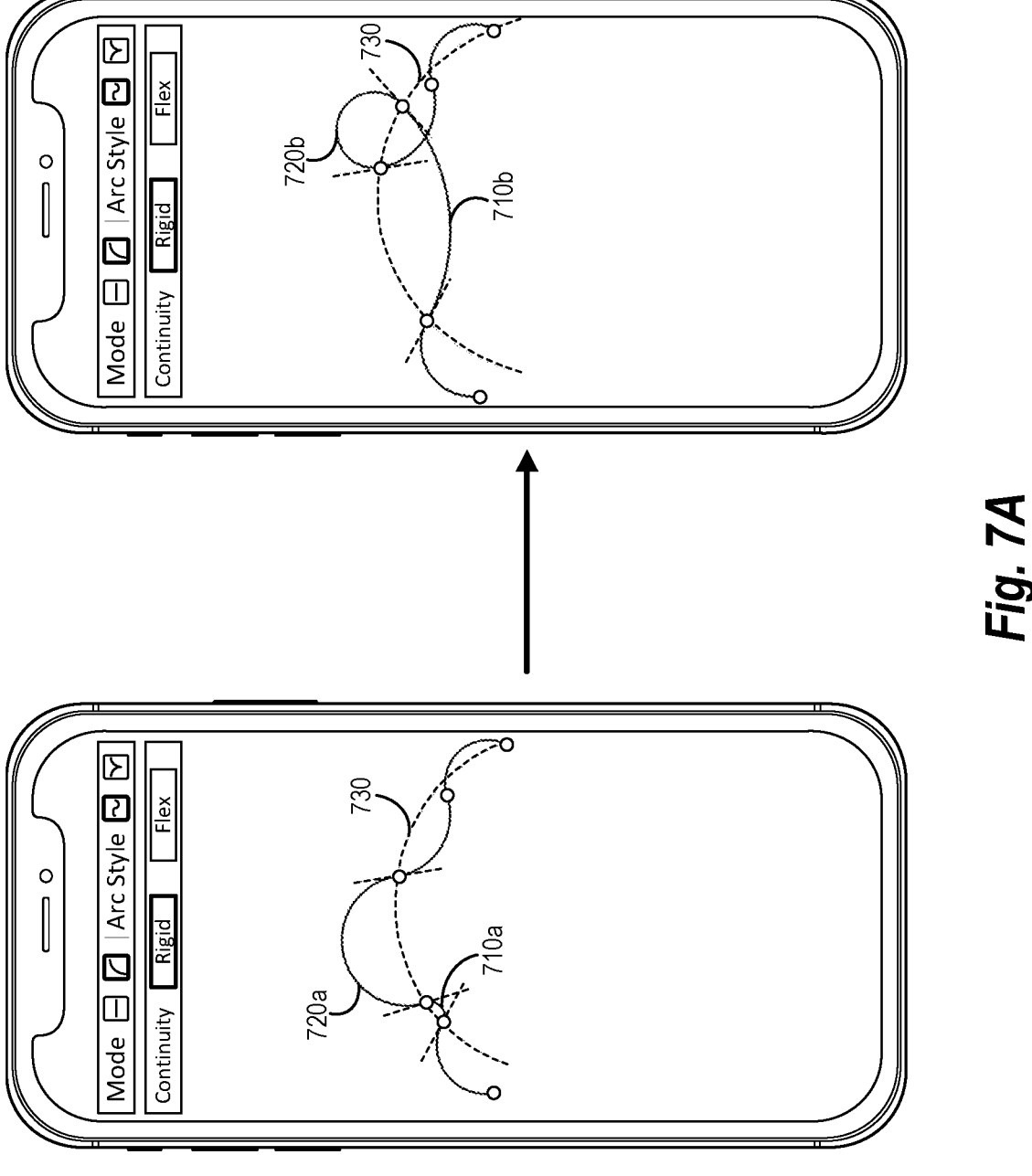
FIGS. 7A-7B illustrate example flows and computer-implemented algorithms for modifying an arc path segment with a rigid-rigid-rigid continuity setting in accordance with one or more embodiments.
Figure 7B:
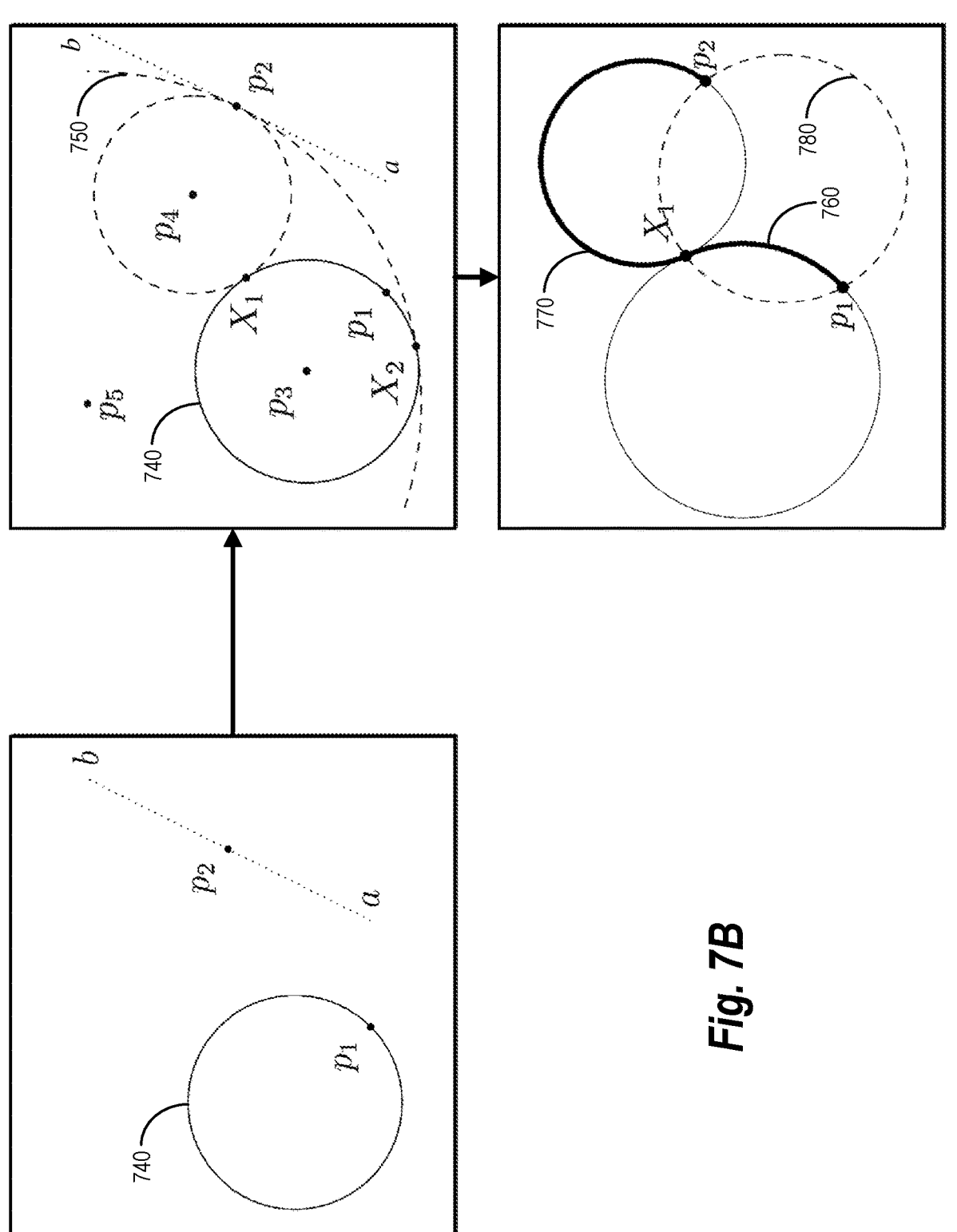

As mentioned, the digital arc design system 106 dynamically generates and accesses arc path segments utilizing multiple editing scenarios for the continuity settings of three endnodes A, B, and C. FIGS. 7A-7B illustrate example flows and computer-implemented algorithms for modifying an arc path segment with a rigid-rigid-rigid continuity setting in accordance with one or more embodiments.

As shown, the digital arc design system 106 generates an arc path segment comprising rigid endnode A, rigid endnode B (connecting circular arc segment 710*a* and circular arc segment 720*a*), and rigid endnode C. Thus, the arc path segment represents an arc path segment with a rigid-rigid-rigid continuity setting for endnodes A-B-C. When the endnode B is rigid, moving endnode B is constrained to a set of possible positions where the incoming and outgoing tangents are congruent. Indeed, as shown, the digital arc design system 106 maintains endnode B on a rigid continuity shape 730 to allow the tangents of all three endnodes (A, B, and C) to remain congruent. In particular, with fixed positions of rigid endnode A, rigid endnode B, and rigid endnode C, there is a limited set of possible positions (on the rigid continuity shape 730) where endnode B could be placed by the digital arc design system 106 for the incoming and outgoing tangents of endnode A, B, and C to maintain congruency. Indeed, the digital arc design system 106 determines possible positions where the endnode B can be maintained as a rigid endnode (e.g., where rigid continuity is possible) and displays the positions as a rigid continuity shape 730.

To illustrate, in FIG. 7A, when the digital arc design system 106 modifies the arc path segment comprising circular arc segment 710*a* and circular arc segment 720*a* to determine a modified circular arc segment 710*b* and a modified circular arc segment 710*b*, the digital arc design system 106 moves the endnode B along the rigid continuity shape 730 (e.g., snaps the arc path segment to only positions along the rigid continuity shape 730). In this instance, the digital arc design system 106 maintains the qualities of a circular arc for the modified circular arc segment 710*b* and modified circular arc segment 720*b*, maintains the geometric continuity at endnode B, and maintains the tangential continuity at endnode B (rigid continuity). Similar to the above discussion, in one or more embodiments, the digital arc design system 106 measures the incoming tangent angle and outgoing tangent angle to be congruent if the difference between the angles is 0 degrees, 180 degrees, or any multiple of 180 degrees. For example, as shown in FIG. 6A, the tangential continuity of endnode B is 0 degrees (e.g., selected by the "Arc Style" menu) which achieves a congruent, smooth transition at endnode B. Alternatively, the digital arc design system 106 utilizes an incoming tangent angle and outgoing tangent angle with a congruency at endnode B of 180 degrees to achieve a congruent corner transition at endnode B.

As illustrated by FIG. 7B, the digital arc design system 106 determines a rigid continuity conversion shape 780 for a rigid-rigid-rigid continuity setting. In particular, to determine the rigid continuity conversion shape 780 the digital arc design system 106 starts with an arc path segment consisting of a first circular arc segment and a second circular arc segment. Further, the digital arc design system 106 determines a modified arc path segment by modifying the radius of a first circular arc segment to determine a modified circular arc segment 760. Further, the digital arc design system 106 utilizes the calculations below to determine a position and radius of a modified circular arc segment 770 (by modifying the second circular arc segment). Indeed, the digital arc design system 106 simultaneously maintains the qualities of a circular arc for the modified circular arc segment 760 and modified circular arc segment 770 and maintains a rigid-rigid-rigid continuity setting for the arc path segment.

To illustrate, as shown on FIG. 7B, the digital arc design system 106 performs calculations to determine the modified circular arc segment 760 and modified circular arc segment 770. In particular, the digital arc design system 106 determines a circle 740, with a centerpoint $p_3$, a radius $r_1$, a starting point $p_1$, an ending point $p_2$, and a tangent ab. To determine a rigid continuity conversion shape, the digital arc design system 106 determines a circle 750 that comprises point $p_2$ with a tangent ab that touches circle 740 at some point $X_2$. The digital arc design system 106 uses an equation of the line that is perpendicular to tangent ab and passes through the point $p_2$ as $f(x)=mx+v$. In one or more embodiments, the digital arc design system 106 determines the coefficients for resulting square equation as follows:

$$A = p_3 \cdot x - p_2 \cdot x - m(p_2 \cdot y - v) + m(p_3 \cdot y - v)$$
$$B = p_2 \cdot x^2 + (p_2 \cdot y - v)^2 - p_3 \cdot x^2 - (p_3 \cdot y - v)^2 - r_1^2$$
$$a = A^2 - r_1^2 - r_1^2 m^2$$
$$b = AB + 2r_1^2 p_3 \cdot x + 2r_1^2 m(p_3 \cdot y - v)$$
$$c = \frac{B^2}{4} - r_1^2 p_3 \cdot x^2 - r_1^2 (p_3 \cdot y - v)^2$$

The digital arc design system 106 determines the solution for square equation $ax^2+bx+c=0$, which provides $x_1$ and $x_2$ and, in turn, the points for $p_4=(x_1, f(x_1))$ and $p_5=(x_2, f(x_2))$. Then, in one or more embodiments, the digital arc design system 106 determines points $X_1$ and $X_2$ as follows:

$$r_2 = \sqrt{(p_4 \cdot x - p_2 \cdot x)^2 + (p_4 \cdot y - p_2 \cdot y)^2}$$
$$r_3 = \sqrt{(p_5 \cdot x - p_2 \cdot x)^2 + (p_5 \cdot y - p_2 \cdot y)^2}$$
$$X_1 = \left(p_3 \cdot x + \frac{r_1(p_4 \cdot x - p_3 \cdot x)}{r_1 + r_2}, p_3 \cdot y + \frac{r_1(p_4 \cdot y - p_3 \cdot y)}{r_1 + r_2}\right)$$
$$X_2 = \left(p_3 \cdot x + \frac{r_1(p_5 \cdot x - p_3 \cdot x)}{r_1 + r_3}, p_3 \cdot y + \frac{r_1(p_5 \cdot y - p_3 \cdot y)}{r_1 + r_3}\right)$$

To explain further, in order to maintain a rigid-rigid-rigid continuity setting, the digital arc design system 106 maintains the center endnode at points along the circle that pass through $p_1$, $p_2$ and $X_1$ as determined by the digital arc design system 106 as described above. To illustrate, as further shown in FIG. 7B, the digital arc design system 106 determines and displays a rigid continuity conversion shape 780 (which corresponds the rigid continuity shape 730). As shown, when the digital arc design system 106 modifies the arc path segment comprising a first circular arc segment (or corresponding circular arc segment 710a) and a second circular arc segment (or corresponding circular arc segment 720a) to determine the first modified circular arc segment 760 (or corresponding circular arc segment 710b), the digital arc design system 106 moves the center endnode (or corresponding endnode B) along positions on the rigid continuity conversion shape 780 (or corresponding rigid continuity shape 730).

Figure 8A:
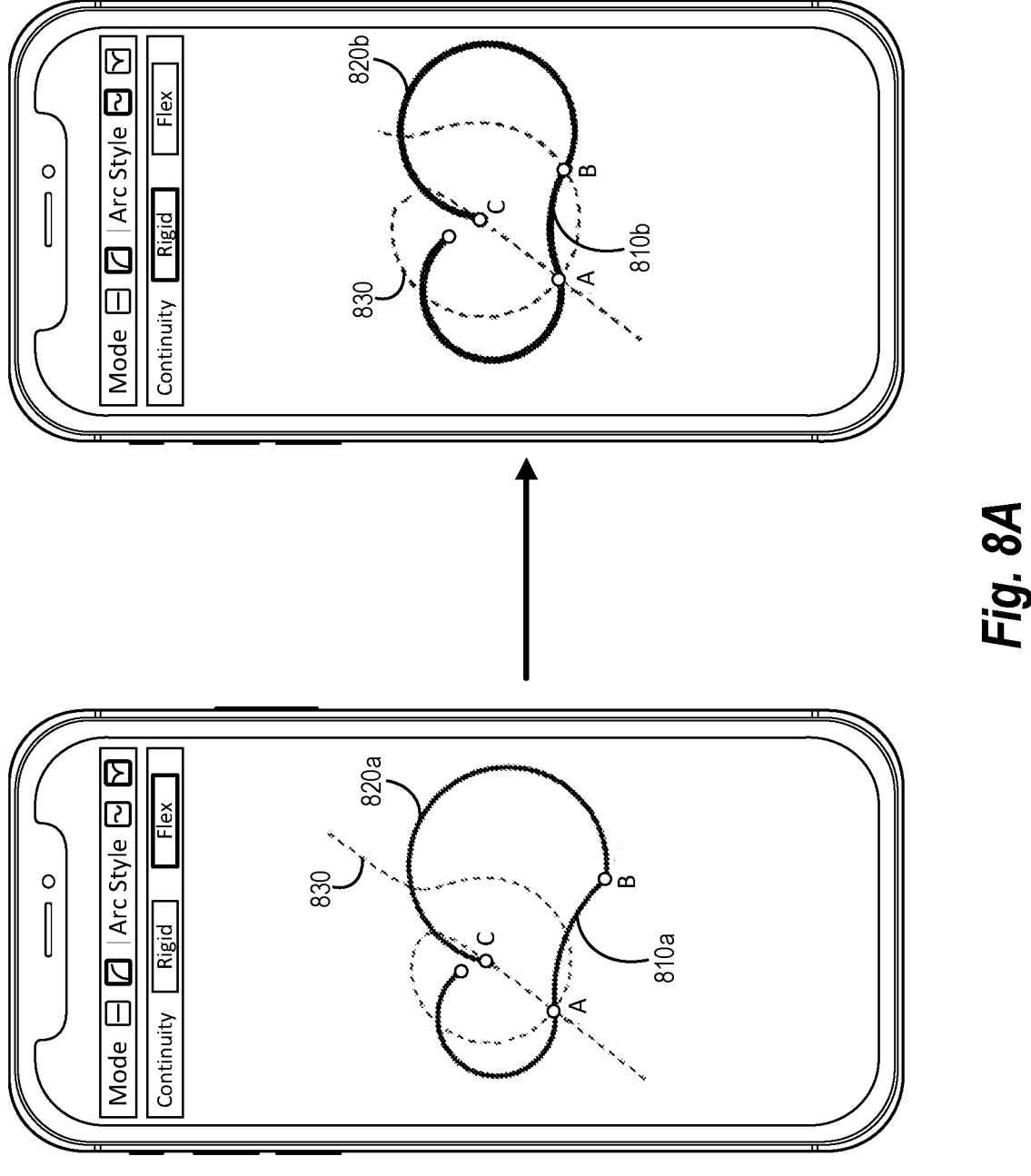
FIGS. 8A-8B illustrate example flows and computer-implemented algorithms for modifying an arc path segment with a rigid-flexible-flexible continuity setting to a rigid-rigid-flexible continuity setting in accordance with one or more embodiments.
Figure 8B:
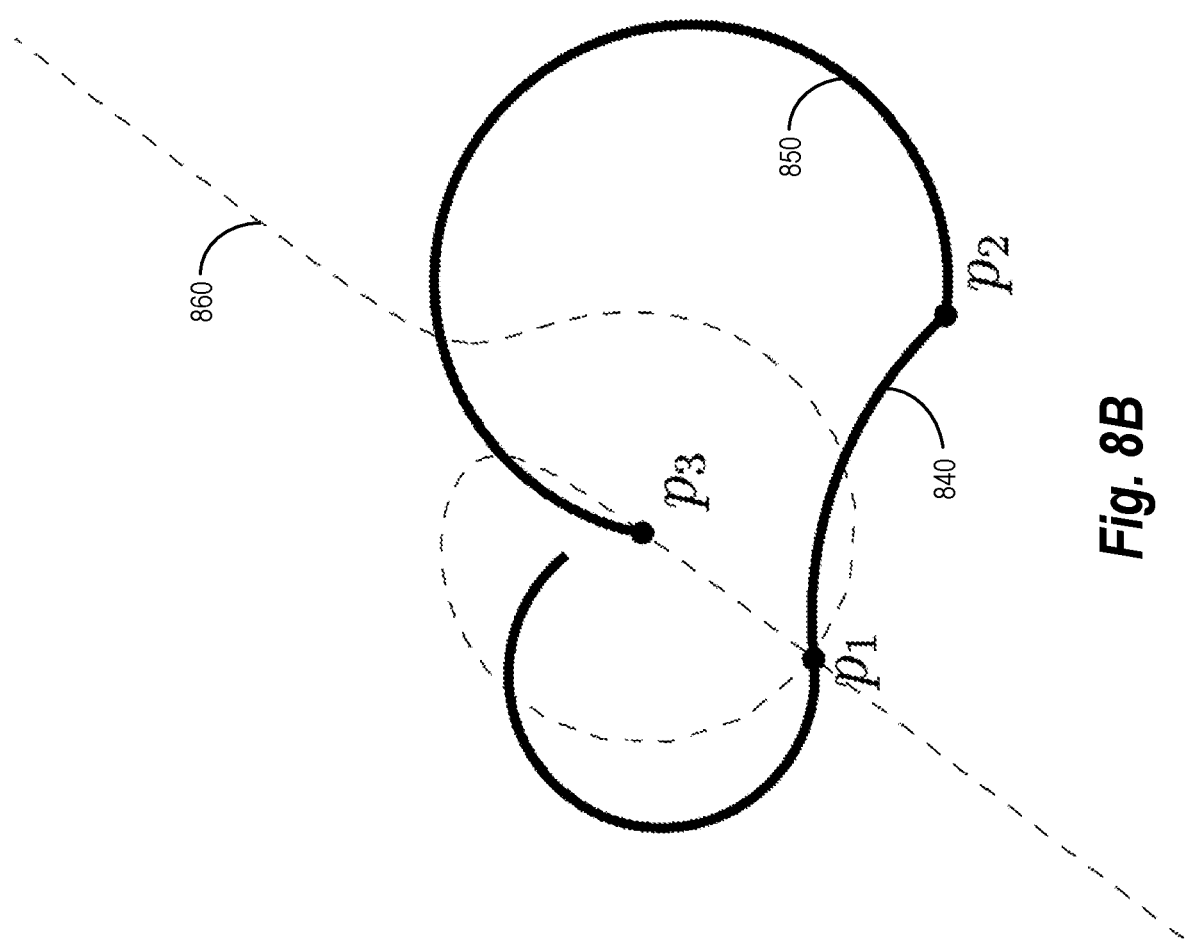

As mentioned, the digital arc design system 106 can dynamically generate and access arc path segments utilizing multiple editing scenarios for the continuity settings of various endnodes. FIGS. 8A-8B illustrate example flows and computer-implemented algorithms for modifying an arc path segment with a rigid-flexible-flexible continuity setting to a rigid-rigid-flexible continuity setting in accordance with one or more embodiments.

As shown, the digital arc design system 106 generates an arc path segment comprising rigid endnode A, flexible endnode B (connecting circular arc segment 710a and circular arc segment 720a), and flexible endnode C. Thus, the arc path segment represents an arc path segment with a rigid-flexible-flexible continuity setting for endnodes A-B-C. When the digital arc design system 106 maintains flexible continuity at endnode B, the digital arc design system 106 imposes no limitations regarding possible positions when moving endnode B (but requires geometric continuity for the endnode B). However, as shown, the digital arc design system 106 determines a set of possible positions where the incoming and outgoing tangents at endnode B are congruent (rigid continuity). Indeed, as shown, the digital arc design system 106 positions endnode B on a rigid continuity conversion shape 830 to maintain congruent tangents for endnode B and endnode C. In particular, with fixed positions for flexible endnode A, rigid endnode B, and rigid endnode C, there are a limited set of possible positions (on the rigid continuity conversion shape 830) where endnode B could be placed by the digital arc design system 106 for the incoming and outgoing tangents of endnode B to be congruent. As shown, the digital arc design system 106 determines possible positions where the endnode B maintains the qualities of a rigid endnode (e.g., where rigid continuity is possible) and displays the positions as a rigid continuity conversion shape 830. Notably, the rigid continuity conversion shape 830 can include a strophoid in this circumstance (i.e., rather than a circle).

To illustrate, in FIG. 8A, when the digital arc design system 106 modifies the arc path segment comprising circular arc segment 810a and circular arc segment 820a to determine a modified circular arc segment 810b and a modified circular arc segment 810b, the digital arc design system 106 moves the endnode B along the rigid continuity conversion shape 830. In this instance, the digital arc design system 106 maintains the qualities of a circular arc for the modified circular arc segment 810b and modified circular arc segment 820b, maintains the geometric continuity at endnode B, and maintains the tangential continuity at endnode B (rigid continuity). Similar to the above discussion, in one or more embodiments, the digital arc design system 106 measures the incoming tangent angle and outgoing tangent angle to be congruent if the difference between the angles is 0 degrees, 180 degrees, or any multiple of 180 degrees. Furthermore, as shown in FIG. 6A, the tangential continuity is 0 degrees (e.g., selected by the "Arc Style" menu) which achieves a congruent, smooth transition at endnode B. Alternatively, the digital arc design system 106 utilizes an incoming tangent angle and outgoing tangent angle with a congruency of 180 degrees (or a multiple thereof) to achieve a congruent corner transition at endnode B.

As illustrated by FIG. 8B, the digital arc design system 106 determines the rigid continuity conversion shape 860. In particular, to determine the rigid continuity conversion shape 860, the digital arc design system 106 determines a rigid continuity conversion shape 860 that resembles a complex version of a strophoid. In particular, the digital arc design system 106 uses the coordinates of points $p_1$ and $p_3$. The digital arc design system 106 defines the angle of the tangent at point $p_1$ relative to the x axis defined as $\alpha$ and the angle between the points $p_2$ and $p_3$ along the arc is $\beta$. The digital arc design system 106 determines the angle between the tangent angles at $p_1$ and $p_1$ $p_2$ to be $\gamma$. In one or more embodiments, the digital arc design system 106 determines the angle $\theta$ as:

$$\theta = \frac{4\alpha - \beta + 2\gamma + \pi}{4}.$$

Additionally, the digital arc design system 106 determines an equation of the hyperbola as the curve inverted through the circle with the center at $p_3$ at an arbitrary radius R. In one or more embodiments, the digital arc design system 106 uses a radius of R=100. To obtain the hyperbola, the digital arc design system 106 inverts $p_3$ through the circle and rotates it by the angle $\theta$. With the circle defined as $c_x$, $c_y$, R, the digital arc design system 106 translates everything to the center of the circle and determines the inverted coordinates as follows:

$$x' = \frac{R(x - c_x)}{(x - c_x)^2 + (y - c_y)^2}$$

$$y' = \frac{R(y - c_y)}{(x - c_x)^2 + (y - c_y)^2}$$

Further, in one or more embodiments, if $$\left| \frac{x'}{y'} \right| > 1,$$

then the hyperbola is horizontal and the digital arc design system 106 calculates the coefficients as follows:

$$t_1 = \arcsin\left(\frac{y'}{x'}\right)$$

$$a = \frac{\cos t_1 - x'}{2}$$

$$\Delta x = \frac{x'}{2}$$

$$\Delta y = \frac{y'}{2}$$

$$x(t) = a\sec t + \Delta x$$

$$y(t) = a\tan t + \Delta y$$

Further, in one or more embodiments, if $$\left| \frac{x'}{y'} \right| < 1,$$

then the hyperbola is vertical and the digital arc design system 106 calculates the coefficients by swapping x and y as follows:

$$t_1 = \arcsin\left(\frac{x'}{y'}\right)$$

$$a = \frac{\cos t_1 - y'}{2}$$

$$\Delta x = \frac{x'}{2}$$

$$\Delta y = \frac{y'}{2}$$

$$x(t) = a\tan t + \Delta x$$

$$y(t) = a\sec t + \Delta y$$

In addition, in one or more embodiments, the digital arc design system 106 rotates by $-\theta$ to obtain:

$$x_1(t) = x(t)\cos\theta + y(t)\sin\theta$$

$$y_1(t) = y(t)\cos\theta - x(t)\sin\theta$$

Furthermore, the digital arc design system 106 inverts the solution back around the circle to obtain the strophoid shape (for the rigid continuity conversion shape 860) as follows:

$$x_2(t) = \frac{Rx_1^2(t)}{x_1^2(t) + y_1^2(t)} + c_x$$

$$y_2(t) = \frac{Ry_1^2(t)}{x_1^2(t) + y_1^2(t)} + c_y$$

As further shown in FIG. 8B, the digital arc design system 106 determines the rigid continuity conversion shape 860 for display within a graphical user interface. To illustrate, in order to modify an arc path segment to a rigid-rigid-flexible continuity setting, the digital arc design system 106 maintains the endnode $p_2$ along the rigid continuity conversion shape 860 (e.g., a strophoid shape) that passes through $p_1$ and $p_2$ and determined by the digital arc design system 106 as described above. For example, the digital arc design system 106 displays the rigid continuity conversion shape 860. When the digital arc design system 106 modifies the arc path segment comprising a circular arc segment 840 and the circular arc segment 850 to convert the endnode $p_2$ to a rigid continuity setting (e.g., a rigid-rigid-flexible continuity setting), the digital arc design system 106 moves the endnode $p_2$ along positions on the rigid continuity conversion shape 780.

As mentioned, there are multiple editing scenarios for the continuity settings of the three endnodes A, B, and C of an arc path segment. In one or more embodiments, although not shown, the digital arc design system 106 modifies an arc path segment with a rigid-rigid-flexible continuity setting (for endnodes A, B, and C). When the digital arc design system 106 modifies endnode B utilizing a rigid-rigid-flexible continuity setting, the digital arc design system 106 calculates a circular arc segment from the rigid side to a given point (there is only one solution). Further, the digital arc design system 106 determines a circular arc segment from the given point using the current tangent to the flexible endnode (there is also only one solution).

Figure 9C:
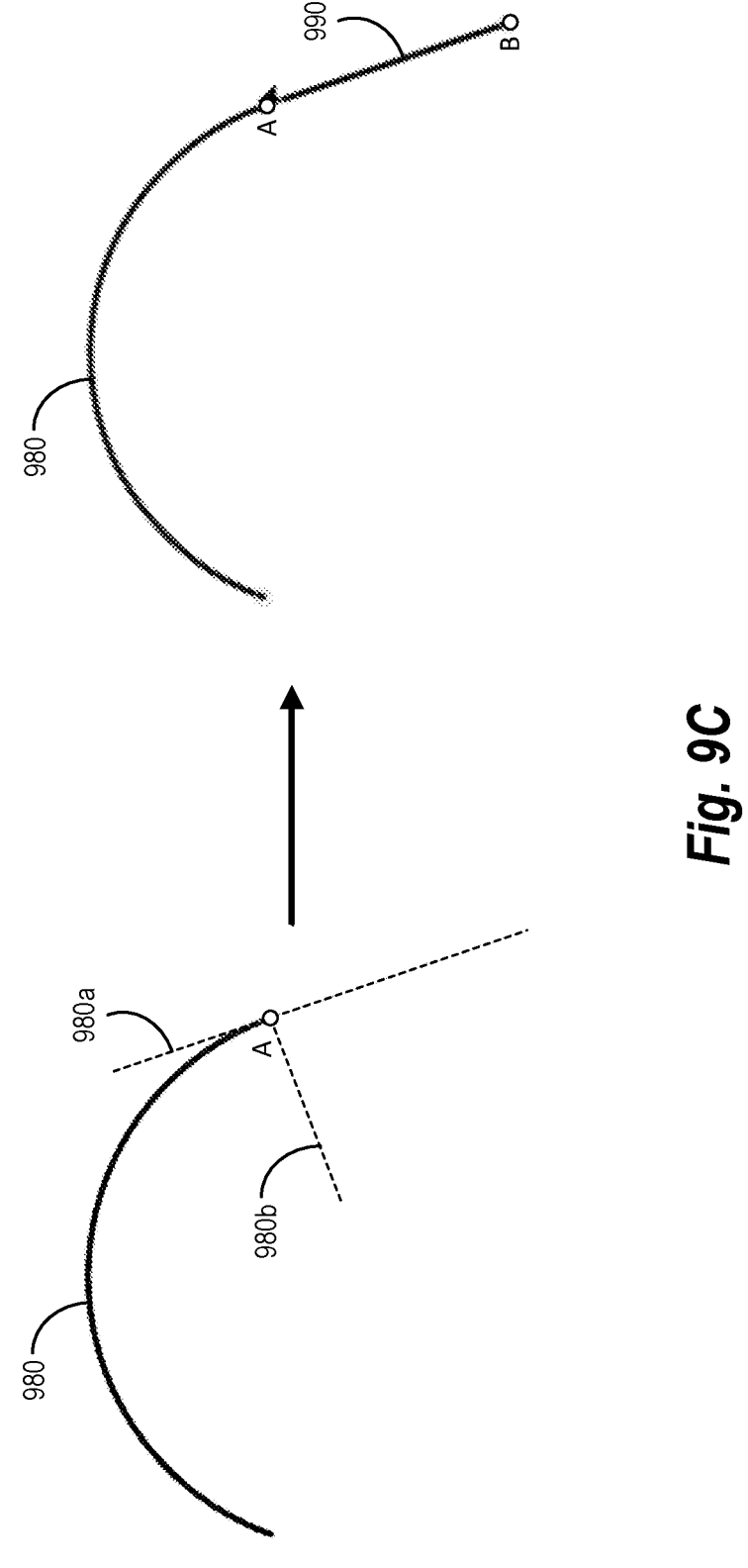

As mentioned above, in some implementations the digital arc design system 106 utilizes snapping techniques with circular arc segments. FIGS. 9A-9C illustrate an example of generating and snapping a new circular arc segment to a radius, a center, or a tangent of a circular arc segment in accordance with one or more embodiments.

As shown in FIG. 9A, the digital arc design system 106 snaps a new circular arc segment to the center of an existing circular arc segment. For example, the digital arc design system 106 determines a circular arc segment 910 with a centerpoint 920a and a radius 920b. Further, based on user interaction with the user device, the digital arc design system 106 determines one or more possible positions for a new circular arc segment 930 (e.g., shown by guidance shape 920c) based on the circular arc segment 910 and the centerpoint 920a. In addition, the digital arc design system 106 determines and displays the new circular arc segment 930. As shown, the circular arc segment 910 and the new circular arc segment 930 are parallel circular arc segments.

In one or more implementations, the digital arc design system 106 automatically snaps the new circular arc segment 930 to the same center point to generate a parallel circular arc segment. For instance, the digital arc design system 106 can identify a first user interaction starting the new circular arc segment 930. Upon detecting that a location (e.g., of a cursor or finger) is within a threshold distance or angle of being parallel to the circular arc segment 910, the digital arc design system 106 can snap the new circular arc segment 930 to a parallel path of the circular arc segment 910 such that the new circular arc segment 930 and the circular arc segment 910 share the centerpoint 920a (albeit with a different radius). Thus, the digital arc design system 106 can scan all other design segments in the digital design document to determine when a current user interaction with a circular arc segment falls within a parallel threshold of an existing design segment and snap the circular arc segment to the centerpoint. Upon receiving an additional selection of an endpoint for the new circular arc segment 930, the digital arc design system 106 generates the new circular arc segment 930 with the centerpoint 920a.

In some implementations, the digital arc design system 106 automatically snaps the new circular arc segment 930 to the centerpoint 920a and in some implementations the digital arc design system 106 receives a user selection of the circular arc segment 930 and/or the centerpoint 920a and then generates the new circular arc segment 910 with the centerpoint 920a. Thus, for instance, the digital arc design system 106 can receive a selection of a parallel arc generation tool and user selection of the centerpoint 920a. In response, the digital arc design system 106 can generate an arc that follows the centerpoint 920a at a different radius and through a particular selected arc angle.

As further shown in FIG. 9B, the digital arc design system 106 snaps a new circular arc segment to the radius of an existing circular arc segment. For example, the digital arc design system 106 determines a circular arc segment 940 with a centerpoint 950a and a radius 950b. Further, based on user interaction with the user device (e.g., based on a cursor or finger being within a threshold distance or angle of the radius 950b), the digital arc design system 106 determines one or more possible positions for a new circular arc segment 970a (e.g., shown by guidance shape 960b and guidance shape 960c) based on the circular arc segment 940 and the radius 950b. As further shown, the digital arc design system 106 optionally displays additional guidance markers such as the centerpoint 960a (e.g., the centerpoint for the guidance shape 960b). In addition, the digital arc design system 106 determines and displays the new circular arc segment 970a.

In one or more implementations, the digital arc design system 106 automatically snaps the new circular arc segment 970a to a radius of the existing circular arc segment 940. For instance, the digital arc design system 106 can identify a first user interaction starting the new circular arc segment 970a. Upon detecting that a new generated arc segment radius (e.g., generated by the movement of a cursor or finger) is within a threshold size of the radius 950b of the circular arc segment 940, the digital arc design system 106 can snap the new circular arc segment 970a to match the radius size of radius 950b such that the new circular arc segment 970a and the circular arc segment 940 share the same radius size (although, as shown, they are not constrained to the same centerpoint). Thus, the digital arc design system 106 can scan all other design segments in the digital design document to determine when a current user interaction with a circular arc segment falls within a threshold radius size of an existing design segment and snap the circular arc segment radius size to match the radius (e.g., radius 950b). Upon receiving an additional selection of an endpoint for the new circular arc segment 970a, the digital arc design system 106 generates the new circular arc segment 970a with the radius size to match radius 950b.

In some implementations, the digital arc design system 106 automatically snaps the new circular arc segment 970a to match radius 950b and in some implementations the digital arc design system 106 receives a user selection of the circular arc segment 970a, circular arc segment 940, and/or the radius 950b and then generates the new circular arc segment 970a sized to match radius 950b. Thus, for instance, the digital arc design system 106 can receive a selection of a radius arc matching tool and user selection of the circular arc segment 970a, circular arc segment 940, and/or the radius 950b. In response, the digital arc design system 106 can display one or more possible positions for a new circular arc segment 970a (e.g., shown by guidance shape 960b and guidance shape 960c). Further, the digital arc design system 106 can generate a new circular arc segment 970a sized to match radius 950b.

In this manner, as shown by circular arc pattern 970b, the digital arc design system 106 generates and displays a visually coherent repeated pattern of circular arc segments by creating new circular arc segments with the same radius. Additionally, as shown by circular arc pattern 970c, the digital arc design system 106 generates and displays a design comprising similar circular arc segments with the same radius.

In addition, as shown in FIG. 9C, the digital arc design system 106 snaps a new design segment to the tangent of an existing circular arc segment. For example, the digital arc design system 106 determines a circular arc segment 980 with a tangent line 980a and perpendicular tangent line 980b. Further, based on user interaction with the user device, the digital arc design system 106 determines one or more possible positions for a new design segment 990 (e.g., based on tangent line 980a and perpendicular tangent line 980b) connected to the endnode A. Indeed, the digital arc design system 106 utilizes at least two snapping options comprising the tangent line 980a and the perpendicular tangent line 980b. Notably, the digital arc design system 106 treats each point of the circular arc segment 980 as a tangent emitter. As shown in FIG. 9C, the digital arc design system 106 creates visually consistent shapes comprising a circular arc segment based on the tangent angle at point A.

In one or more implementations, the digital arc design system 106 automatically snaps the new design segment 990 to a tangent line 980$a$ of the existing circular arc segment 980. For instance, the digital arc design system 106 can identify a first user interaction starting the new design segment 990 at endnode A. Upon detecting that a new design segment (e.g., generated by the movement of a cursor or finger) is within a threshold position of the tangent line 980$a$ (and/or the perpendicular tangent line 980$b$) of the circular arc segment 980, the digital arc design system 106 can snap the new design segment 990 to the tangent line 980$a$ (and/or the perpendicular tangent line 980$b$) such that the new design segment 990 and the circular arc segment 980 share the same tangent at the shared endnode A. Thus, the digital arc design system 106 can determine the tangents (and/or perpendicular tangents) at a connected endnode A to determine when a current user interaction with a design segment falls within a threshold position of the tangent of an existing design segment and snap the new design segment to the existing tangent (or perpendicular tangent). Upon receiving an additional selection of an endpoint B for the new design segment 990, the digital arc design system 106 generates the new design segment 990 with the tangent to match tangent line 980$a$.

In some implementations, the digital arc design system 106 automatically snaps the new design segment 990 to match tangent line 980$a$ (or perpendicular tangent line 980$b$) and in some implementations the digital arc design system 106 receives a user selection of the circular arc segment 980, tangent line 980$a$, and/or perpendicular tangent line 980$b$ and then generates the new design segment 990 to match tangent line 980$a$ (or perpendicular tangent line 980$b$). Thus, for instance, the digital arc design system 106 can receive a selection of a tangent matching tool and user selection of the circular arc segment 980, tangent line 980$a$, and/or perpendicular tangent line 980$b$. In response, the digital arc design system 106 can display one or more possible positions for a new design segment 990 (e.g., shown by tangent line 980$a$ and perpendicular tangent line 980$b$). Notably, in one or more implementations, the digital arc design system 106 generates the new design segment 990 that is tangent to tangent line 980$a$ and not connected to circular arc segment 980 (e.g., not connected to endnode A). Further, the digital arc design system 106 can generate a new design segment 990 to match the tangent of tangent line 980$a$ (or perpendicular tangent line 980$b$).

Figure 10A:
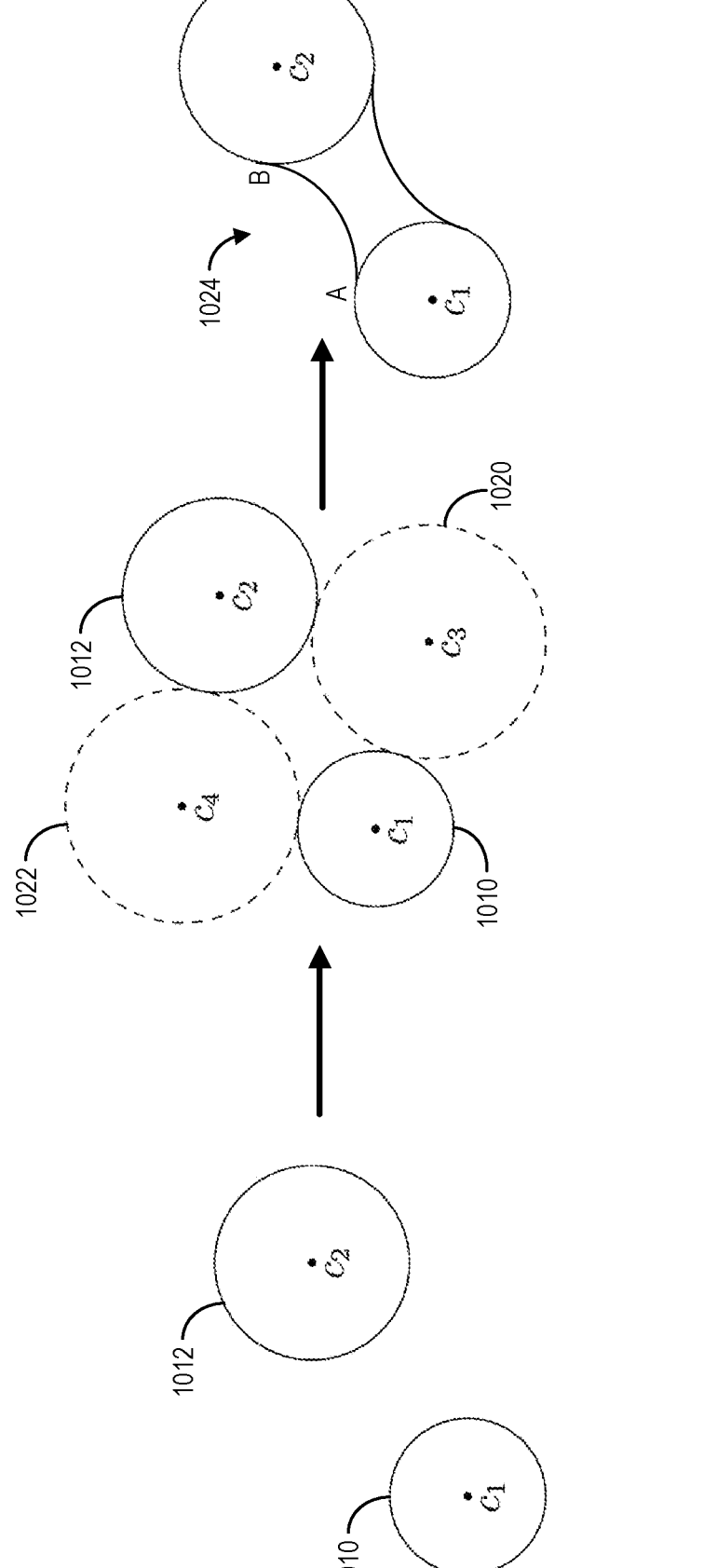
FIGS. 10A-10C illustrate possible computer-implemented algorithms for connecting two preexisting design segments utilizing a circular arc segment in accordance with one or more embodiments.
Figure 10B:
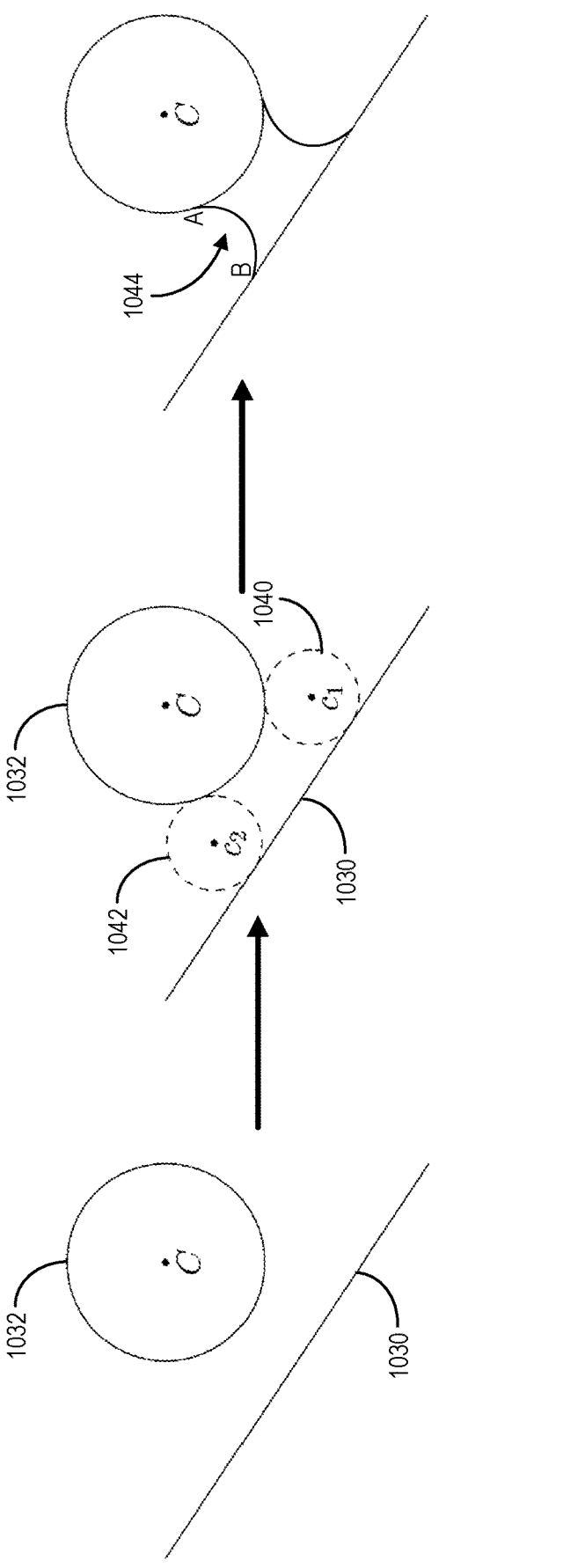
Figure 10C:
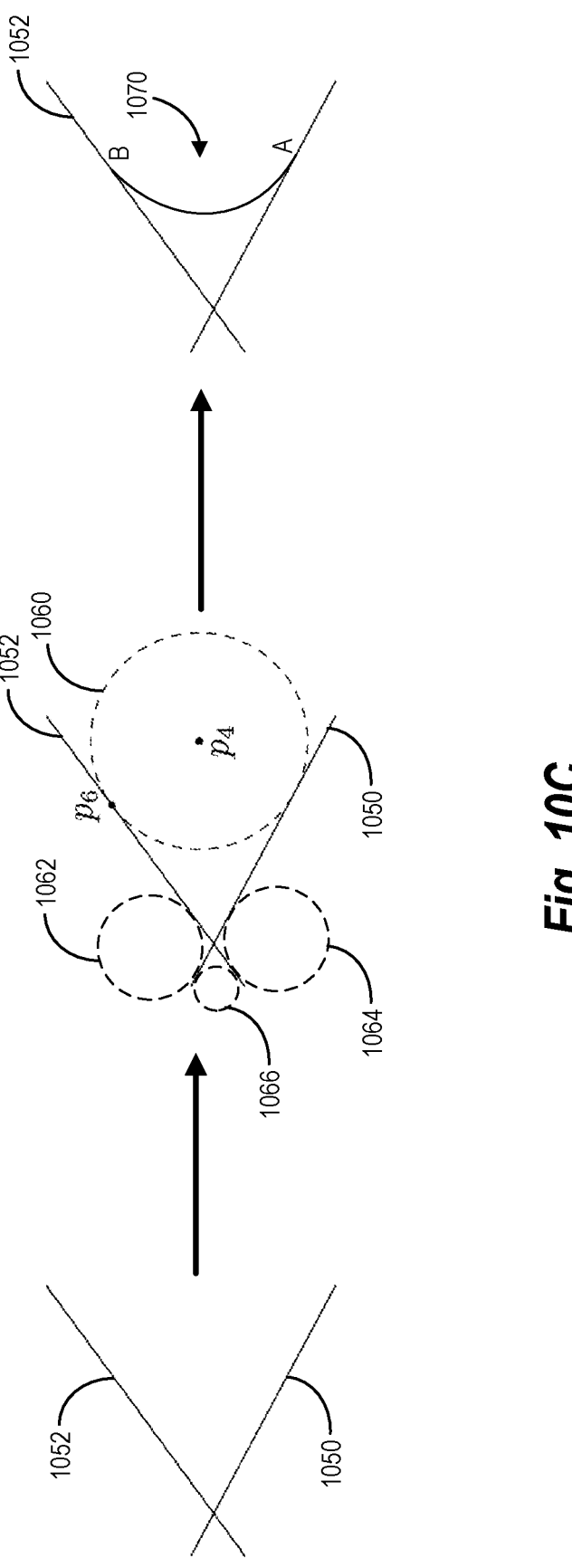

As mentioned above, in some implementations the digital arc design system 106 connects various design elements with circular arc segments. FIGS. 10A-10C illustrate connecting two preexisting design elements with a circular arc segment in accordance with one or more embodiments.

As shown in FIG. 10A, the digital arc design system 106 connects two existing circular design segments with a bridge circular arc segment. To illustrate, the digital arc design system 106 utilizes a circular design element 1010 with center $c_1$ and radius $r_1$ and a circular design element 1012 with center and $c_2$ and radius $r_2$. The digital arc design system 106 finds the value of the center $c_3$ of a third circular guidance shape 1020 with radius $r_3$ that touches the circular design element 1010 and the circular design element 1012. In one or more embodiments, the digital arc design system 106 performs the calculation as follows:

$$a = \sqrt{(c_1 \cdot x - c_2 \cdot x)^2 + (c_1 \cdot y - c_2 \cdot y)^2} - r_1 - r_2$$

$$b = \frac{(r_2 + a)^2 - (r_2 + r_3)^2 + (r_1 + r_3)^2 - r_1^2}{2(r_1 + r_2 + a)}$$

$$h = \sqrt{(r_1 + r_3)^2 - (r_1 + b)^2}$$

$$d_1 = \frac{r_1 + b}{r_1 + r_2 + a}$$

$$g = (c_1 \cdot x + (c_2 \cdot x - c_1 \cdot x)d_1, c_1 \cdot y + (c_2 \cdot y - c_1 \cdot y)d_1)$$

$$d_2 = \frac{h}{r_1 + r_2 + a}$$

$$c_3 = (g \cdot x - (c_2 \cdot y - c_1 \cdot y)d_2, g \cdot y + (c_2 \cdot x - c_1 \cdot x)d_2)$$

$$c_4 = (g \cdot x + (c_2 \cdot y - c_1 \cdot y)d_2, g \cdot y - (c_2 \cdot x - c_1 \cdot x)d_2)$$

As shown in FIG. 10A, the digital arc design system 106 determines a circular guidance shape 1020 and a circular guidance shape 1022 that comprise positions for generating and displaying additional circular arc segments to connect the circular design element 1010 and the circular design element 1012 (i.e., with tangent continuity).

To illustrate, in one or more implementations, the digital arc design system 106 generates the new bridge circular arc segment 1024 to connect the circular design element 1010 and circular design element 1012. For instance, the digital arc design system 106 can identify a first user interaction starting the new bridge circular arc segment 1024 (e.g., by selecting the circular design element 1010). Upon detecting the selection (e.g., generated by the movement of a cursor or finger) on the circular design element 1010, the digital arc design system 106 can generate and (optionally) display the circular guidance shape 1022 as described above. Upon receiving an additional selection of the circular design element 1012, the digital arc design system 106 generates and displays the new bridge circular arc segment 1024 connecting the circular design element 1010 and circular design element 1012. In particular, the digital arc design system 106 determines the endnodes A and B and generates the circular arc segment between the endnodes A and B (e.g., based on the circular guidance shape 1022).

As further shown in FIG. 10B, the digital arc design system 106 connects an existing circular design element and existing line segment with a bridge circular arc segment. To illustrate, the digital arc design system 106 utilizes a line segment 1030 defined as f(x)=mx+v and a circular design element 1032 with center C and radius $R_1$. The digital arc design system 106 determines a circular guidance shape 1040 and a circular guidance shape 1042 with radius $R_2$ that touching the line segment 1030 and the circular design element 1032. In one or more embodiments, the digital arc design system 106 performs the calculation as follows:

$$h = \frac{R}{\cos(\arctan(m))}$$

$$s = \text{sign}(C \cdot y - mC \cdot x - v)$$

$$x_3 = \frac{C \cdot y + \dfrac{C \cdot x}{m} - v}{m + \dfrac{1}{m}}$$

$$w_1 = (x_3, mx_3 + v)$$

-continued $$d = \sqrt{(C \cdot x - w_1 \cdot x)^2 + (C \cdot y - w_1 \cdot y)^2}$$

$$g = d - R_1$$

$$x_4 = C \cdot x - \frac{R_1}{d}(C \cdot x - w_1 \cdot x)$$

$$y_4 = C \cdot y - \frac{R_1}{d}(C \cdot y - w_1 \cdot y)$$

$$A = c + sh - C \cdot y$$

$$B = (R_1 + R)^2$$

$$a = 1 + m^2$$

$$b = 2Am - 2C \cdot x$$

$$c = A^2 + C \cdot x^2 - B$$

$$g(x) = mx + v + sh$$

Furthermore, the digital arc design system 106 solves the square equation $ax^2 + bx + c = 0$ to find the centers of the circular guidance shape 1040 as $(x_1, g(x_1))$ and the circular guidance shape 1042 as $(x_2, g(x_2))$. As shown in FIG. 10B, the digital arc design system 106 determines a circular guidance shape 1040 and a circular guidance shape 1042 that comprise positions for generating and displaying additional circular arc segments to connect the line segment 1030 and the circular design element 1032.

To illustrate, in one or more implementations, the digital arc design system 106 generates the new bridge circular arc segment 1044 to connect the circular design element 1032 and line segment 1030. For instance, the digital arc design system 106 can identify a first user interaction starting the new bridge circular arc segment 1044 at endnode A. Upon detecting the selection of endnode A (e.g., generated by the movement of a cursor or finger) that lies on the circular design element 1032, the digital arc design system 106 can determine (and optionally display) the circular guidance shape 1042 as described above. Upon receiving an additional selection of an endnode B for the new bridge circular arc segment 1044 that lies on the line segment 1030, the digital arc design system 106 generates and displays the new bridge circular arc segment 1044 connecting the circular design element 1032 and line segment 1030.

As further shown in FIG. 10C, in one or more embodiments, the digital arc design system 106 connects two existing line segments with a bridge circular arc segment. To illustrate, the digital arc design system 106 utilizes a line segment 1050 defined as $f(x) = m_1x + c_1$ and line segment 1052 defined as $g(x) = m_2x + c_2$. The digital arc design system 106 finds a circular guidance shape 1060 with radius r that touches line segment 1050 and line segment 1052. In one or more embodiments, the digital arc design system 106 performs the calculation as follows:

$$x_3 = \frac{c_2 - c_1}{m_1 - m_2}$$

$$y_3 = f(x_3)$$

$$m_3 = \frac{m_1\sqrt{m_2^2 + 1} + m_2\sqrt{m_1^2 + 1}}{\sqrt{m_2^2 + 1} + \sqrt{m_1^2 + 1}}$$

$$c_3 = \frac{c_1\sqrt{m_2^2 + 1} + c_2\sqrt{m_1^2 + 1}}{\sqrt{m_2^2 + 1} + \sqrt{m_1^2 + 1}}$$

-continued $$\alpha = \arctan(m_1)$$

$$\beta = \arctan(m_3)$$

$$\gamma = \alpha - \beta$$

$$d = \frac{r}{\tan(\gamma)}$$

$$x_6 = x_3 + d\cos(\alpha)$$

$$y_6 = y_3 + d\sin(\alpha)$$

$$c_4 = f(x_6) - m_4x_6$$

$$p_4 = \left( \frac{c_4 - c_3}{\frac{1}{m_1} + m_3}, c_4 - \frac{c_4 - c_3}{1 + m_1m_3} \right)$$

Notably, by repeating the same operations the digital arc design system 106 determines three other circular guidance shapes that touch line segment 1050 and line segment 1052 in different quadrants. As shown in FIG. 10C, the digital arc design system 106 determines a circular guidance shape 1060 and three corresponding circular guidance shapes (e.g., circular guidance shape 1062, circular guidance shape 1064, and circular guidance shape 1066) in the other three quadrants formed by the intersection of the line segment 1050 and the line segment 1052 that comprise positions for generating and displaying additional circular arc segments to connect the line segment 1050 and the line segment 1052.

To illustrate, in one or more implementations, the digital arc design system 106 generates the new bridge circular arc segment 1070 to connect the line segment 1050 and line segment 1052. For instance, the digital arc design system 106 can identify a first user interaction starting the new bridge circular arc segment 1070. Upon detecting the selection of the first user interaction that lies on the line segment 1050, the digital arc design system 106 can generate (and optionally display) the circular guidance shape 1060 as described above. Upon receiving an additional selection of the line segment 1052, the digital arc design system 106 generates and displays the new bridge circular arc segment 1070 connecting the line segment 1050 and the line segment 1052.

Figure 11:
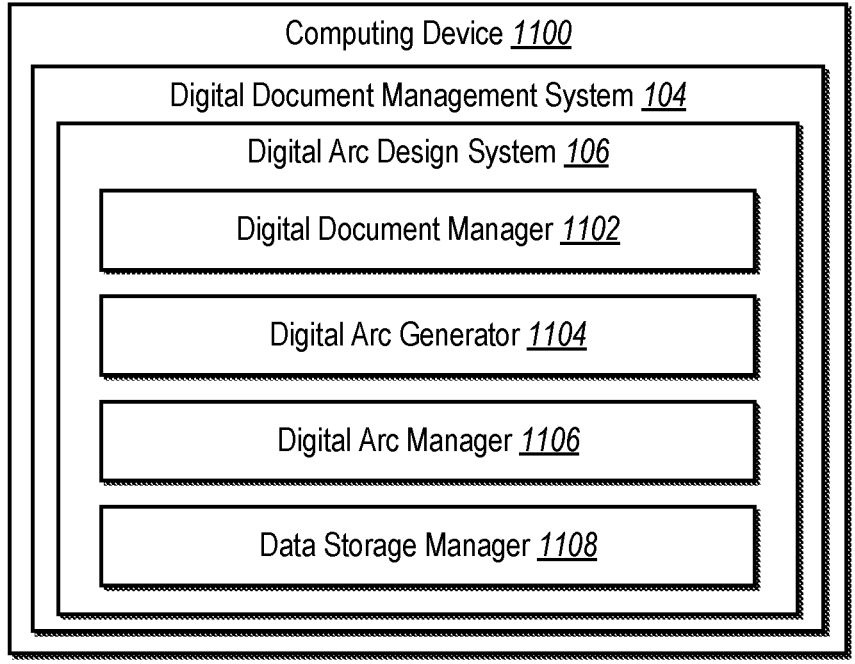
FIG. 11 illustrates a schematic diagram of a digital arc design system in accordance with one or more embodiments.

Turning now to FIG. 11, additional detail will now be provided regarding various components and capabilities of the digital arc design system 106. In particular, FIG. 11 illustrates the digital arc design system 106 implemented by the computing device 1100 (e.g., the server device(s) 102 and/or one of the client devices 110a-110n discussed above with reference to FIG. 1). Additionally, the digital arc design system 106 is also part of the digital document management system 104. As shown in FIG. 11, the digital arc design system 106 includes, but is not limited to, a digital document manager 1102, a digital arc generator 1104, a digital arc manager 1106, and a data storage manager 1108.

As just mentioned, and as illustrated in FIG. 11, the digital arc design system 106 includes the digital document manager 1102. In one or more embodiments, the digital document manager 1102 retrieves or creates a selected digital design document. As mentioned above, the digital document manager 1102 manages digital design documents including digital image documents that incorporate circular arc segment content. Furthermore, the digital document manager 1102 monitors and identifies changes to circular arc content within the digital design documents. For example, in one or more embodiments, the digital document manager 1102 monitors and identifies user-initiated modifications of the image content within the digital design document.

Additionally, as shown in FIG. 11, the digital arc design system 106 includes the digital arc generator 1104. The digital arc generator 1104 creates circular arc segments as design elements within a digital design document that maintain the fidelity of and the constraints inherent in native arc elements. In particular, the digital arc generator 1104 can update the digital image document to contain a circular arc segment within a sequential arc path segment comprising multiple design elements interconnected by endnodes. Furthermore, the digital arc generator 1104 can update the arc path segment by connecting additional design elements at the endnodes of the arc path segment based on the continuity settings at the endnodes. In addition, the digital arc generator 1104 can update the digital design document by snapping additional arc segments into position based on an existing arc tangent, radius, and/or center point of a circular arc segment.

As further shown in FIG. 11, the digital arc design system 106 includes the digital arc manager 1106. In particular, the digital arc design system 106 facilitates the manipulation of circular arc elements while maintaining the fidelity of and the constraints inherent in the circular arc elements. In particular, the digital arc manager 1106 provides an interface to modify a circular arc segment connected to other circular arc segments within a digital design document by moving endnodes according to dynamic continuity settings at the endnodes. For example, the digital arc manager 1106 utilizes rigid continuity settings (maintaining tangent continuity across an endnode) and flexible endnodes (maintaining only geometric continuity across an endnode). Moreover, the digital arc manager 1106 utilizes a variety of different approaches depending on the continuity settings for different endnodes of an arc. Furthermore, the digital arc manager 1106 provides unique interface elements for transitioning between continuity settings (e.g., displaying points in the graphical user interface that would transition from flexible endpoints to rigid endpoints with tangent continuity).

Additionally, as shown, the digital arc design system 106 includes data storage manager 1108. In particular, data storage manager 1108 (implemented by one or more memory devices) stores the digital design documents, including the circular arc segment content. The data storage manager 1108 facilitates the use of the digital design documents by the digital arc design system 106.

Each of the components 1102-1108 of the digital arc design system 106 can include software, hardware, or both. For example, the components 1102-1108 can include one or more instructions stored on a computer-readable storage medium and executable by processors of one or more computing devices, such as a client device or server device. When executed by the one or more processors, the computer-executable instructions of the digital arc design system 106 can cause the computing device(s) to perform the methods described herein. Alternatively, the components 1102-1108 can include hardware, such as a special-purpose processing device to perform a certain function or group of functions. Alternatively, the components 1102-1108 of the digital arc design system 106 can include a combination of computer-executable instructions and hardware.

Furthermore, the components 1102-1108 of the digital arc design system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1108 of the digital arc design system 106 may be implemented as a stand-alone application, such as a desktop or mobile application. Furthermore, the components 1102-1108 of the digital arc design system 106 may be implemented as one or more web-based applications hosted on a remote server. Alternatively, or additionally, the components 1102-1108 of the digital arc design system 106 may be implemented in a suite of mobile device applications or "apps." For example, in one or more embodiments, the digital arc design system 106 can comprise or operate in connection with digital software applications such as: ADOBE® PHOTOSHOP, ADOBE® ILLUSTRATOR, ADOBE® LIGHTROOM, ADOBE® INDESIGN, ADOBE® XD, ADOBE® PREMIERE PRO, ADOBE® AFTER EFFECTS, or ADOBE® DIMENSION, ADOBE® ACROBAT PRO DC. The foregoing are either registered trademarks or trademarks of Adobe Inc. in the United States and/or other countries.

FIGS. 1-11, the corresponding text, and the examples provide a number of different methods, systems, devices, and non-transitory computer-readable media of the digital arc design system 106. In addition to the foregoing, one or more embodiments can also be described in terms of flowcharts comprising acts for accomplishing a particular result, as shown in FIG. 12. The acts shown in FIG. 12 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 12. In some embodiments, a system can be configured to perform the acts of FIG. 12. Alternatively, the acts of FIG. 12 can be performed as part of a computer-implemented method.

FIG. 12 illustrates a flowchart of a series of acts 1200 for modifying a digital document with a digital arc design system 106 in accordance with one or more embodiments. While FIG. 12 illustrates acts according to one embodiment, alternative embodiments may omit, add to, reorder, and/or modify any acts shown in FIG. 12.

FIG. 12 illustrates an example series of acts 1200 for utilizing a digital arc design system 106 to review a digital design document. In particular, the series of acts 1200 includes an act 1202 of generating a circular arc segment comprising a first endnode and a second endnode, wherein the second endnode is connected to a design segment comprising a third endnode. Specifically, the act 1202 can include generating a circular arc segment comprising a first endnode and a second endnode, wherein the second endnode of the circular arc segment is connected to a design segment comprising the second endnode and a third endnode. As illustrated, the series of acts 1200 can also include an act 1204 of determining a first continuity setting for the first endnode, a second continuity setting for the second endnode, and a third continuity setting for the third endnode. As illustrated, the series of acts 1200 can also include an act 1206 of, in response to a user interaction, moving the second endnode to a new position and generating a modified design segment according to the first continuity setting, the second continuity setting, and the third continuity setting. Specifically, the act 1206 can include, in response to receiving a link request from the user device for sharing the digital design document with an additional user device, providing, to the user device, a digital link to access the multifurcated digital document.

In addition (or in the alternative) to the acts described above, the digital arc design system series of acts 1200 can include generating the circular arc segment connected to an additional circular arc segment at the second endnode. The series of acts 1200 can also include generating the modified circular arc segment and a modified additional circular arc segment according to the first continuity setting, the second continuity setting, and the third continuity setting.

Moreover, in one or more embodiments, the digital arc design system 106 series of acts 1200 includes generating a second continuity setting comprising a flexible continuity setting and further comprising generating the modified circular arc segment and the modified additional circular arc segment by maintaining geometric continuity at the second endnode. Further still, in some embodiments, the digital arc design system 106 series of acts 1200 includes generating a rigid continuity conversion shape comprising a plurality of locations wherein the second endnode is compatible with a rigid continuity setting and providing the rigid continuity conversion shape for display via the user interface with the modified circular arc segment and the modified additional circular arc segment.

Furthermore, in one or more embodiments, the digital arc design system series of acts 1200 includes, in response to a user interaction via the user interface, moving the second endnode to one of the plurality of locations of the rigid continuity conversion shape and converting the second continuity setting from the flexible continuity setting to the rigid continuity setting. Moreover, one or more embodiments, the series of acts 1200 includes generating a further modified circular arc segment and a further modified additional circular arc segment according to the first continuity setting, the rigid continuity setting, and the third continuity setting by maintaining tangent continuity between the further modified circular arc segment and the further modified additional circular arc segment at the second endnode.

Further still, in one or more embodiments, the series of acts 1200 includes a first continuity setting comprising a flexible continuity setting, the second continuity setting comprising a rigid continuity setting, and the third continuity setting comprising the flexible continuity setting and further includes generating the modified circular arc segment and the modified additional circular arc segment by maintaining geometric continuity at the first endnode, maintaining tangent continuity at the second endnode, and maintaining geometric continuity at the third endnode.

Moreover, in one or more embodiments, the series of acts 1200 includes a second continuity setting of a rigid continuity setting and further comprising generating a rigid continuity conversion shape comprising a plurality of locations wherein the second endnode is compatible with the rigid continuity setting. The series of acts 1200 can further include providing a rigid continuity conversion shape for display via the user interface of the client device and generating the modified circular arc segment and the modified additional circular arc segment by snapping the second endnode to the rigid continuity conversion shape.

Moreover, one or more embodiments, the series of acts 1200 includes generating a new circular arc segment and snapping the new circular arc segment to at least one of a radius, a center, or a tangent of the circular arc segment. Furthermore, in one or more embodiments, the series of acts 1200 includes generating a new design segment and generating a bridge circular arc segment that spans between the new design segment and one of the circular arc segment or the design segment such that the bridge circular arc segment has a fourth endnode tangent to the new design segment and a fifth endnode tangent to one of the circular arc segment or the design segment.

Moreover, in one or more embodiments, the series of acts 1200 includes generating a first circular arc segment comprising a first endnode and a second endnode and generating a second circular arc segment connected to the first circular arc segment by the second endnode and comprising a third endnode. The series of acts 1200 can also include wherein the second endnode comprises a first continuity setting and, based on a user interaction with a user interface, displaying the first circular arc segment and the second circular arc segment: modifying the first continuity setting to a second continuity setting; and moving the second endnode to a new location to generate a first modified circular arc segment and a second modified circular arc segment according to the second continuity setting.

Further still, in one or more embodiments, the series of acts 1200 includes modifying a first continuity setting to a second continuity setting by converting a second endnode from a flexible continuity setting to a rigid continuity setting; and moving the second endnode to the new location to generate the first modified circular arc segment and the second modified circular arc segment according to the flexible continuity setting by maintaining geometric continuity at the second endnode. Moreover, in one or more embodiments, the series of acts 1200 includes generating a rigid continuity conversion shape comprising a plurality of potential locations for the second endnode wherein a first tangent angle of the first modified circular arc segment at the second endnode and a second tangent angle of the second modified circular arc segment at the second endnode are compatible with a rigid continuity setting. The series of acts 1200 can further include displaying the rigid continuity conversion shape.

In addition, in one or more embodiments, the series of acts 1200 includes modifying a first continuity setting to a second continuity setting by snapping a second endnode to a rigid continuity conversion shape; and converting the second endnode from a flexible continuity setting to a rigid continuity setting. Furthermore, in one or more embodiments, the series of acts 1200 includes generating an additional rigid continuity conversion shape and displaying the rigid continuity conversion shape and the additional rigid continuity conversion shape.

In addition, in one or more embodiments, the series of acts 1200 includes a second continuity setting at a second endnode comprising a flexible continuity setting, wherein generating the modified circular arc segment and the modified design segment maintains geometric continuity at the second endnode. Moreover, in one or more embodiments, the series of acts 1200 includes generating a rigid continuity conversion shape comprising a plurality of locations wherein the second endnode is compatible with a rigid continuity setting and providing the rigid continuity conversion shape for display via the user interface with the modified circular arc segment and the modified design segment.

In one or more embodiments, the series of acts 1200 includes, in response to the user interaction via the user interface, moving a second endnode to one of the plurality of locations of a rigid continuity conversion shape and converting a second continuity setting from a flexible continuity setting to a rigid continuity setting. Furthermore, in one or more embodiments, the series of acts 1200 includes generating the modified circular arc segment from the circular arc segment without converting the circular arc segment to a Bézier curve.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
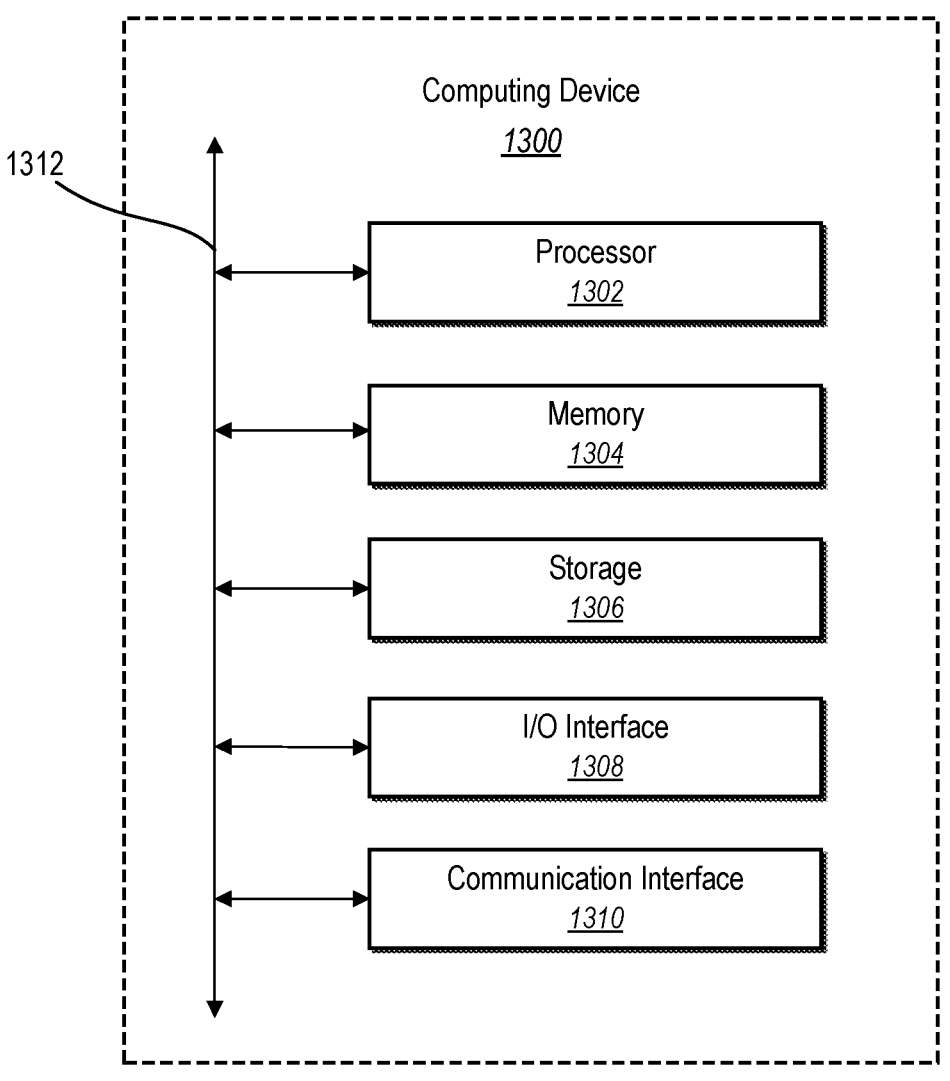
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., server device(s) 102, client devices 110a-110n, and computing device 1300). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:

generating, within a user interface of a client device, a circular arc segment with a first radius comprising a first endnode and a second endnode, wherein the second endnode of the circular arc segment is connected to a design segment comprising the second endnode and a third endnode;

determining a first continuity setting comprising a first tangent continuity for the first endnode, a second continuity setting comprising a second tangent continuity for the second endnode, and a third continuity setting for the third endnode, wherein a first tangent of the first endnode is different than a second tangent of the second endnode; and in response to a user interaction via the user interface of the client device, dynamically updating a graphical rendering of the circular arc segment and the design segment as the second endnode is moved by:

moving, within the user interface of the client device, the second endnode to a new location while maintaining the first continuity setting for the first endnode and the second continuity setting for the second endnode; and generating, within the user interface of the client device, a modified circular arc segment with a second radius, wherein the second radius is different than the first radius, and a modified design segment according to the first continuity setting, the second continuity setting, and the third continuity setting.

2. The method of claim 1, wherein:

generating the circular arc segment and the design segment comprises generating the circular arc segment connected to an additional circular arc segment at the second endnode; and generating the modified circular arc segment and the modified design segment comprises generating the modified circular arc segment and a modified additional circular arc segment according to the first continuity setting, the second continuity setting, and the third continuity setting.

3. The method of claim 2, further comprising generating the modified circular arc segment and the modified additional circular arc segment by maintaining geometric continuity at the second endnode.

4. The method of claim 3 further comprising:

generating a rigid continuity conversion shape comprising a plurality of locations wherein the second endnode is compatible with a rigid continuity setting; and providing the rigid continuity conversion shape for display via the user interface with the modified circular arc segment and the modified additional circular arc segment.

5. The method of claim 4, further comprising:

in response to an additional user interaction via the user interface, moving the second endnode to one of the plurality of locations of the rigid continuity conversion shape.

6. The method of claim 5, further comprising generating a further modified circular arc segment and a further modified additional circular arc segment according to the first continuity setting, the rigid continuity setting, and the third continuity setting by maintaining tangent continuity between the further modified circular arc segment and the further modified additional circular arc segment at the second endnode.

7. The method of claim 2, wherein the first continuity setting comprises a rigid continuity setting, the second continuity setting comprises a rigid continuity setting, and the third continuity setting comprises a flexible continuity setting and further comprising generating the modified circular arc segment and the modified additional circular arc segment by maintaining tangent continuity at the first endnode, maintaining tangent continuity at the second endnode, and maintaining geometric continuity at the third endnode.

8. The method of claim 2, wherein the second continuity setting comprises a rigid continuity setting and further comprising:

generating a rigid continuity shape comprising a plurality of locations wherein the second endnode is compatible with the rigid continuity setting;

providing the rigid continuity shape for display via the user interface of the client device; and generating the modified circular arc segment and the modified additional circular arc segment by snapping the second endnode to the rigid continuity shape.

9. The method of claim 1, further comprising:

generating a new circular arc segment; and snapping the new circular arc segment to at least one of a radius, a center, or a tangent of the circular arc segment.

10. The method of claim 1, further comprising:

generating a new design segment; and generating a bridge circular arc segment that spans between the new design segment and one of the circular arc segment or the design segment such that the bridge circular arc segment has a fourth endnode tangent to the new design segment and a fifth endnode tangent to one of the circular arc segment or the design segment.

11. A system comprising:

a memory component; and one or more processing devices coupled to the memory component, the one or more processing devices to perform operations comprising:

generating, within a user interface of a client device, a first circular arc segment with a first radius comprising a first endnode and a second endnode, wherein the first endnode comprises a first continuity setting comprising a first tangent continuity for a first tangent corresponding to the first endnode;

generating, within the user interface, a second circular arc segment connected to the first circular arc segment by the second endnode and comprising a third endnode, wherein:

the second endnode comprises a second continuity setting comprising a second tangent continuity for a second tangent corresponding to the second endnode; and the second tangent is different than the first tangent; and based on a user interaction with the user interface, dynamically updating a graphical rendering of the first circular arc segment and the second circular arc segment as the second endnode is moved by:

moving, within the user interface, the second endnode to a new location while maintaining the first continuity setting for the first endnode and the second continuity setting for the second endnode; and generating, within the user interface, a first modified circular arc segment with a second radius, wherein the second radius is different than the first radius, and a second modified circular arc segment according to the first continuity setting and the second continuity setting.

12. The system of claim 11, wherein the operations further comprise:

modifying the second continuity setting to a third continuity setting by converting the second endnode from a rigid continuity setting to a flexible continuity setting; and moving the second endnode to the new location to generate a third modified circular arc segment and a fourth modified circular arc segment according to the flexible continuity setting by maintaining geometric continuity at the second endnode.

13. The system of claim 11, wherein the operations further comprise:

generating a rigid continuity conversion shape comprising a plurality of potential locations for the second endnode wherein a first tangent angle of the first modified circular arc segment at the second endnode and a second tangent angle of the second modified circular arc segment at the second endnode are compatible with a rigid continuity setting; and displaying the rigid continuity conversion shape.

14. The system of claim 13, wherein the operations further comprise modifying the first continuity setting to the second continuity setting by:

snapping the second endnode to the rigid continuity conversion shape.

15. The system of claim 13, wherein the operations further comprise:

generating an additional rigid continuity conversion shape; and displaying the rigid continuity conversion shape and the additional rigid continuity conversion shape.

16. A non-transitory computer readable medium storing executable instructions which, when executed by a processing device, cause the processing device to perform operations comprising:

generating, within a user interface of a client device, a circular arc segment with a first radius comprising a first endnode and a second endnode, wherein the second endnode of the circular arc segment is connected to a design segment comprising the second endnode and a third endnode;

determining a first continuity setting comprising a first tangent continuity for the first endnode, a second continuity setting comprising a second tangent continuity for the second endnode, and a third continuity setting for the third endnode, wherein a first tangent of the first endnode is different than a second tangent of the second endnode; and in response to a user interaction via the user interface of the client device, dynamically updating a graphical rendering of the circular arc segment and the design segment as the second endnode is moved by:

moving, within the user interface of the client device, the second endnode to a new location while maintaining the first continuity setting for the first endnode and the second continuity setting for the second endnode; and generating, within the user interface of the client device, a modified circular arc segment with a second radius, wherein the second radius is different than the first radius, and a modified design segment according to the first continuity setting, the second continuity setting, and the third continuity setting.

17. The non-transitory computer readable medium of claim 16, further comprising:

modifying the second continuity setting to a flexible continuity setting comprising a geometric continuity;

moving the second endnode to an additional location; and generating an additional modified circular arc segment and an additional modified design segment by maintaining geometric continuity at the second endnode.

18. The non-transitory computer readable medium of claim 17, wherein the operations further comprise:

generating a rigid continuity conversion shape comprising a plurality of locations wherein the second endnode is compatible with a rigid continuity setting; and providing the rigid continuity conversion shape for display via the user interface with the modified circular arc segment and the modified design segment.

19. The non-transitory computer readable medium of claim 18, wherein the operations further comprise in response to the user interaction via the user interface, moving the second endnode to one of the plurality of locations of the rigid continuity conversion shape.

20. The non-transitory computer readable medium of claim 16, wherein the operations further comprise generating the modified circular arc segment from the circular arc segment without converting the circular arc segment to a Bézier curve.

*    *    *    *    *